(12) United States Patent
Kobayashi et al.

(10) Patent No.: US 9,199,636 B2
(45) Date of Patent: Dec. 1, 2015

(54) CONTROL DEVICE

(75) Inventors: Yasuhiko Kobayashi, Anjo (JP); Yuma Mori, Kota (JP); Yomei Hakumura, Susono (JP)

(73) Assignee: AISIN AW CO., LTD., Anjo (JP)

( * ) Notice: Subject to any disclaimer, the term of this patent is extended or adjusted under 35 U.S.C. 154(b) by 29 days.

(21) Appl. No.: 14/119,792

(22) PCT Filed: Aug. 8, 2012

(86) PCT No.: PCT/JP2012/070251
§ 371 (c)(1),
(2), (4) Date: Nov. 22, 2013

(87) PCT Pub. No.: WO2013/022038
PCT Pub. Date: Feb. 14, 2013

(65) Prior Publication Data
US 2014/0094342 A1    Apr. 3, 2014

(30) Foreign Application Priority Data
Aug. 8, 2011  (JP) .................. 2011-173216

(51) Int. Cl.
*B60W 10/02* (2006.01)
*B60W 20/00* (2006.01)
(Continued)

(52) U.S. Cl.
CPC .................. *B60W 20/40* (2013.01); *B60K 6/48* (2013.01); *B60L 11/14* (2013.01); *B60W 10/02* (2013.01);
(Continued)

(58) Field of Classification Search
CPC ....... B60W 20/40; Y10S 903/902; B60K 6/38

USPC .................................................. 477/3, 5, 98
See application file for complete search history.

(56) References Cited

U.S. PATENT DOCUMENTS 8,668,621 B2    3/2014  Yoshida et al.
8,712,613 B2    4/2014  Yoshida et al.
(Continued)

FOREIGN PATENT DOCUMENTS

JP    A-2008-007094    1/2008
JP    A-2008-074254    4/2008
(Continued)

OTHER PUBLICATIONS

U.S. Appl. No. 14/235,911, filed Jan. 29, 2014 in the name of Kobayashi et al.
(Continued)

*Primary Examiner* — Justin Holmes
*Assistant Examiner* — Stacey Fluhart
(74) *Attorney, Agent, or Firm* — Oliff PLC

(57) ABSTRACT

A control device for a vehicle drive configured with a power transfer path that includes a first engagement device, a rotary electric machine, and a second engagement device. These elements being arranged in this order from an input member coupled to an engine to an output member that is coupled to the wheels of the vehicle. A mode control unit switches among a first, second, third and fourth control modes in which the rotating electrical machine generates electricity with: (i) both the first and second engagement devices, (ii) both the first and second engagement devices, (iii) the first engagement device in the direct engagement state and with the second engagement device, and (iv) with the first engagement device in the slip engagement state and with the second engagement device.

4 Claims, 10 Drawing Sheets

(51) Int. Cl.
  *B60K 6/48* (2007.10)
  *B60L 11/14* (2006.01)
  *B60W 10/08* (2006.01)
  *B60W 30/184* (2012.01)
  *B60W 10/115* (2012.01)
  *F02D 29/02* (2006.01)
  *B60W 50/00* (2006.01)

(52) U.S. Cl.
  CPC .............. *B60W 10/08* (2013.01); *B60W 10/115* (2013.01); *B60W 30/1843* (2013.01); *B60K 2006/4825* (2013.01); *B60L 2210/40* (2013.01); *B60L 2240/36* (2013.01); *B60L 2240/443* (2013.01); *B60L 2240/507* (2013.01); *B60L 2270/145* (2013.01); *B60W 20/108* (2013.01); *B60W 2050/0095* (2013.01); *B60W 2510/0291* (2013.01); *B60W 2510/087* (2013.01); *B60W 2710/021* (2013.01); *B60Y 2300/429* (2013.01); *F02D 29/02* (2013.01); *Y02T 10/6221* (2013.01); *Y02T 10/6252* (2013.01); *Y02T 10/70* (2013.01); *Y02T 10/7077* (2013.01); *Y02T 10/7241* (2013.01); *Y10S 903/902* (2013.01); *Y10T 477/26* (2015.01)

(56) References Cited

U.S. PATENT DOCUMENTS

| | | | |
|---|---|---|---|
| 8,992,377 | B2 | 3/2015 | Kobayashi |
| 2007/0227790 | A1 | 10/2007 | Tanishima |
| 2007/0272456 | A1 | 11/2007 | Shiiba |
| 2007/0275819 | A1* | 11/2007 | Hirata .............................. 477/5 |
| 2007/0275823 | A1 | 11/2007 | Motosugi et al. |
| 2009/0143189 | A1* | 6/2009 | Hasegawa et al. ................ 477/5 |
| 2010/0248893 | A1* | 9/2010 | Shimanaka ....................... 477/5 |

FOREIGN PATENT DOCUMENTS

| | | |
|---|---|---|
| JP | A-2009-214640 | 9/2009 |
| JP | A-2010-149649 | 7/2010 |
| JP | 2010-190267 A | 9/2010 |
| JP | A-2010-188807 | 9/2010 |
| JP | 2011-031659 A | 2/2011 |

OTHER PUBLICATIONS

Jun. 5, 2015 Office Action issued in U.S. Appl. No. 14/235,911.
Sep. 18, 2012 Search Report issued in International Patent Application No. PCT/JP2012/071081.
International Search Report issued in Application No. PCT/JP2012/070251; Dated Sep. 18, 2012 (With Translation).

* cited by examiner of Japanese Patent Application No. 2011-173216 filed on Aug. 8, 2011 including the specification, drawings and abstract is incorporated herein by reference in its entirety.

BACKGROUND OF THE INVENTION

The present invention relates to control devices that control a vehicle drive device in which a first engagement device, a rotating electrical machine, and a second engagement device are sequentially provided from the internal combustion engine side on a power transmission path connecting an internal combustion engine and wheels.

DESCRIPTION OF THE RELATED ART

There is a technique described in, e.g., the following Japanese Patent Application Publication No. 2008-7094 (JP 2008-7094 A) as related art of such control devices. The names of the members in Patent Document 1 are referred to in parentheses "[ ]" in the description of the section "Description of the Related Art." This control device can implement a WSC positive power generation mode in which the rotating electrical machine [motor generator MG] is made to generate electricity with the first engagement device [first clutch CL1] being in a direct engagement state and the second engagement device [second clutch CL2] being in a slip engagement state. In this WSC positive power generation mode, a vehicle can be driven by using the driving force of the internal combustion engine [engine E], and the rotating electrical machine can be made to generate electricity by using this driving force.

However, in the WSC positive power generation mode, only the second engagement device is in the slip engagement state. Accordingly, the difference in rotational speed between two engagement members that are engaged by the second engagement device tends to be relatively large. Therefore, in the configuration of JP 2008-7094 A, the use of the WSC positive power generation mode is limited depending on the temperature of the second engagement device, and a desired power generation amount (amount of electricity) may not be secured.

SUMMARY OF THE INVENTION

It is therefore desired to implement a control device capable of easily securing a desired power generation amount.

According to an aspect of the present invention, a control device that controls a vehicle drive device in which a first engagement device, a rotating electrical machine, and a second engagement device are sequentially provided from an internal combustion engine side in a power transmission path connecting an internal combustion engine and wheels includes: a mode control unit that switches among a first control mode in which the rotating electrical machine is caused to generate electricity with both the first engagement device and the second engagement device in a slip engagement state, a second control mode in which the rotating electrical machine is caused to generate electricity with both the first engagement device and the second engagement device in a direct engagement state, a third control mode in which the rotating electrical machine is caused to generate electricity with the first engagement device in the direct engagement state and with the second engagement device in the slip engagement state, and a fourth control mode in which the rotating electrical machine is caused to generate electricity with the first engagement device in the slip engagement state and with the second engagement device in the direct engagement state; and a target-amount obtaining unit that obtains at least one of a temperature and a heat generation amount of the second engagement device as a selection target amount, wherein in at least one of a mode shift from the first control mode to the second control mode and a mode shift from the second control mode to the first control mode, the mode control unit executes the mode shift via the third control mode if the selection target amount is smaller than a predetermined selection reference value, and executes the mode shift via the fourth control mode if the selection target amount is equal to or larger than the selection reference value.

The "rotating electrical machine" is used as a concept including all of a motor (electric motor), a generator (electric generator), and a motor-generator that functions both as the motor and the generator as necessary.

The "direct engagement state" represents the state where two engagement members that are engaged by the certain engagement device are engaged so as to rotate together, and the "slip engagement state" represents the state where these two engagement member are engaged so that a driving force can be transmitted therebetween with a rotational speed difference therebetween.

According to the above configuration, since the first control mode can be implemented in which the rotating electrical machine is caused to generate electricity with both the first engagement device and the second engagement device in the slip engagement state, the rotational speed difference between two engagement members to be engaged can be suppressed for both of the first engagement device and the second engagement device, and the heat generation amount can be suppressed in both the first engagement device and the second engagement device. Thus, the first control mode in which the rotating electrical machine is caused to generate electricity can be implemented in relatively many situations, and a desired power generation amount can be easily secured.

According to the above configuration, in the mode shift in at least one direction between the first control mode and the second control mode, the heat generation state of the second engagement device is estimated based on whether or not the selection target amount is smaller than the selection reference value, and the mode via which the mode shift is executed can be appropriately selected from the third control mode and the fourth control mode. That is, if the temperature of the second engagement device is allowed to increase, the third control mode in which the torque of the internal combustion engine can be directly transferred to the rotating electrical machine can be selected to improve energy efficiency. Otherwise, the fourth control mode can be selected to suppress the heat generation amount of the second engagement device. Thus, the shift to the first control mode which allows a desired power generation amount to be easily secured while protecting the second engagement device, or the shift from the first control mode to another mode can be appropriately executed.

The target-amount obtaining unit may obtain at least one of a temperature and a heat generation amount of the first engagement device as a first determination target amount, and obtain at least one of the temperature and the heat generation amount of the second engagement device as a second determination target amount, if the first determination target amount is smaller than a predetermined first determination reference value and the second determination target amount is smaller than a predetermined second determination reference value in the first control mode, control according to a requested driving force, which is requested to drive the wheels, may be executed so that the requested driving force is transmitted to the wheels, and if the first determination target amount is equal to or larger than the first determination reference value and the second determination target amount is equal to or larger than the second determination reference value in the first control mode, control of reducing output torque of the internal combustion engine may be executed so that a driving force that is transmitted to the wheels becomes smaller than the requested driving force.

According to the above configuration, if the first determination target amount is equal to or larger than the first determination reference value and the second determination target amount is equal to or larger than the second determination reference value, the output torque of the internal combustion engine can be reduced to reduce transfer torque of both the first engagement device and the second engagement device. This can reduce the heat generation amount of both engagement devices, and can suppress an increase in temperature.

The target-amount obtaining unit may obtain at least one of the temperature and the heat generation amount of the first engagement device as the first determination target amount, and if the first determination target amount becomes equal to or larger than a predetermined third determination reference value in the first control mode, control of reducing output torque of the rotating electrical machine to reduce a power generation amount of the rotating electrical machine and to reduce the output torque of the internal combustion engine according to an amount of reduction in the output torque of the rotating electrical machine may be executed.

According to the above configuration, if the first determination target amount is equal to or larger than the third determination reference value, the transfer torque of the first engagement device can be reduced according to the amount of reduction in the output torque of the internal combustion engine. This can reduce the heat generation amount of the first engagement device and suppress an increase in temperature. In this case, since the output torque of the internal combustion engine is reduced according to the amount of reduction in the output torque of the rotating electrical machine, the driving force that is transmitted to the wheels can be maintained.

DETAILED DESCRIPTION OF THE EMBODIMENTS

Figure 1:
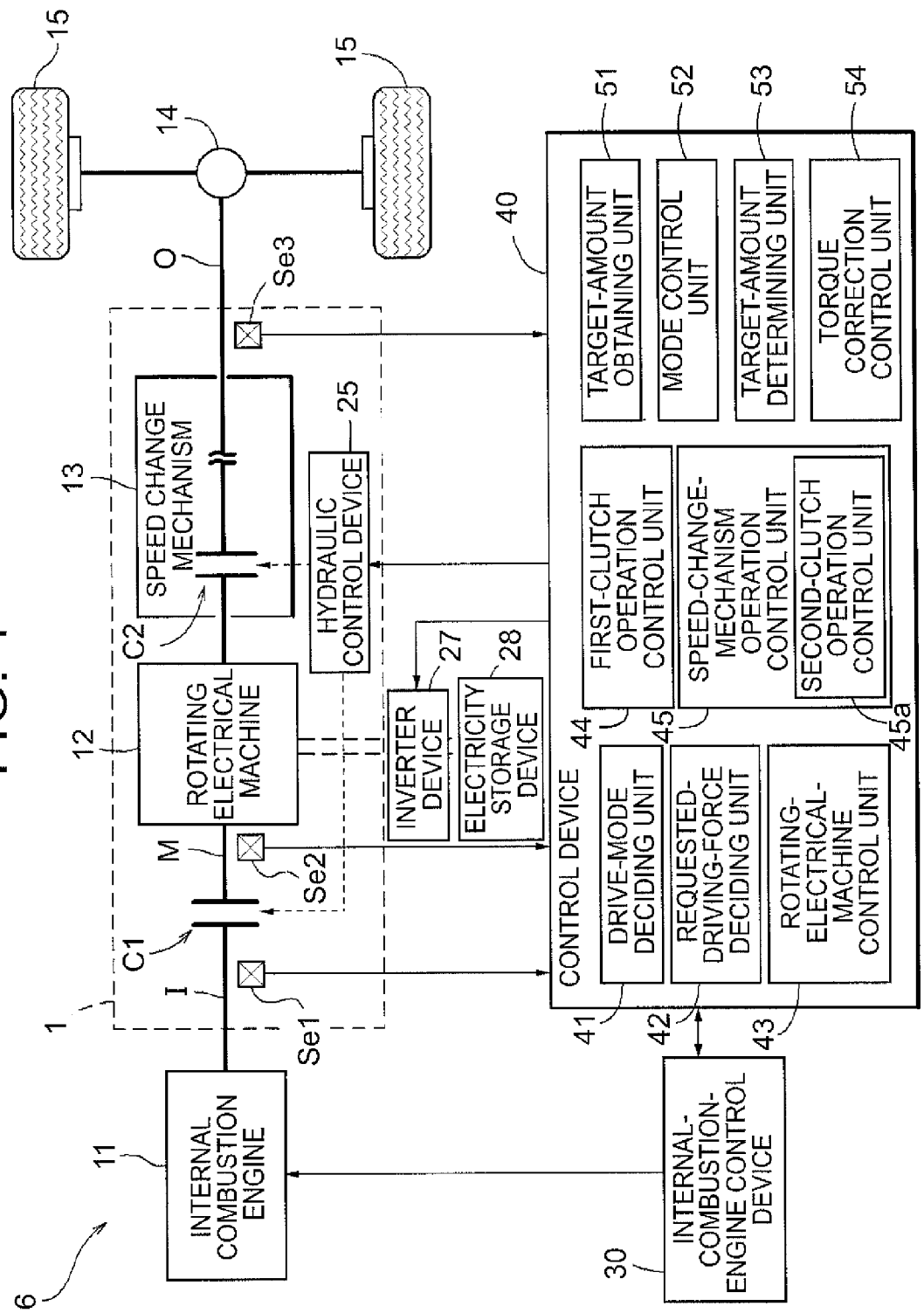
FIG. 1 is a schematic diagram showing a schematic configuration of a control device and a vehicle drive device that is controlled by the control device according to an embodiment of the present invention.

An embodiment of a control device according to the present invention will be described below with reference to the accompanying drawings. As shown in FIG. 1, a control device 40 according to the present embodiment is a control device for vehicle drive devices which controls a drive device 1 that drives a vehicle 6 (hybrid vehicle) including both an internal combustion engine 11 and a rotating electrical machine 12. The drive device 1 and the control device 40 according to the present embodiment will be described in order.

In the following description, the expression "drivingly coupled" refers to the state where two rotating elements are coupled together so that a driving force can be transmitted therebetween, and is used as a concept including the state where the two rotating elements are coupled together so as to rotate together, or the state where the two rotating elements are coupled together so that the driving force can be transmitted therebetween via one or more transmission members. Such transmission members include various members that transmit rotation at the same speed or at a shifted speed (e.g., a shaft, a gear mechanism, a belt, a chain, etc.). The term "driving force" is herein used as a synonym for "torque."

The "engagement pressure" for each engagement device represents the pressure that presses two engagement members, which are engaged by the engagement device, against each other by a hydraulic servo mechanism etc. The "disengagement pressure" represents the pressure at which the engagement device is steadily in a disengagement state (the state where neither rotation nor the driving force is transmitted between two engagement members that are engaged by the engagement device). The "disengagement boundary pressure" represents the pressure at which the engagement device is in a slip boundary state at the boundary between the disengagement state and a slip engagement state (disengagement-side slip boundary pressure). The "engagement boundary pressure" represents the pressure at which the engagement device is in a slip boundary state at the boundary between the slip engagement state and a direct engagement state (engagement-side slip boundary pressure). The "full engagement pressure" represents the pressure at which the engagement device is steadily in the direct engagement state.

1. Configuration of Drive Device

The drive device 1 that is controlled by the control device 40 according to the present embodiment is configured as a drive device for so-called single-motor parallel hybrid vehicles. As shown in FIG. 1, this drive device 1 includes a first clutch C1, a rotating electrical machine 12, and a second clutch C2 (speed change mechanism 13) sequentially from the internal combustion engine 11 side on a power transmission path connecting the internal combustion engine 11 and wheels 15. That is, the rotating electrical machine 12 is provided in the power transmission path connecting the internal combustion engine 11 and the wheels 15, the first clutch C1 is provided between the internal combustion engine 11 and the rotating electrical machine 12, and the second clutch C2 (speed change mechanism 13) is provided between the rotating electrical machine 12 and the wheels 15.

The internal combustion engine 11 is a motor that is driven by fuel combustion in the engine to output power. For example, a gasoline engine, a diesel engine, etc. can be used. The internal combustion engine 11 is drivingly coupled to an input shaft I. In this example, an internal-combustion-engine output shaft such as a crankshaft of the internal combustion engine 11 and the input shaft I rotate together.

The first clutch C1 is capable of releasing driving coupling (transmission of the driving force) between the internal combustion engine 11 and the rotating electrical machine 12. The first clutch C1 is a friction engagement device that selectively drivingly couples the input shaft I to an intermediate shaft M and an output shaft O (in other words, selectively drivingly couples the internal combustion engine 11 to the rotating electrical machine 12 and the wheels 15), and functions as an internal-combustion-engine cut-off clutch that disconnects the internal combustion engine 11 from the wheels 15. A wet multi-plate clutch, a dry single-plate clutch, etc. can be used as the first clutch C1. In the present embodiment, the first clutch C1 corresponds to the "first engagement device" in the present invention.

The rotating electrical machine 12 has a rotor and a stator (not shown), and the rotor of the rotating electrical machine 12 is drivingly coupled to the intermediate shaft M. In this example, the intermediate shaft M functions as a rotor shaft of the rotating electrical machine 12, and the rotor and the intermediate shaft M rotate together. The rotating electrical machine 12 is electrically connected to an electricity storage device 28 such as a battery or a capacitor via an inverter device 27. The rotating electrical machine 12 is supplied with electric power from the electricity storage device 28 to perform power running, or supplies the electric power generated by the output torque of the internal combustion engine 11 (internal combustion engine torque Te) or the inertia force of the vehicle 6 to the electricity storage device 28 to store the electric power therein. The intermediate shaft M as the rotor shaft is an input shaft (shift input shaft) of the speed change mechanism 13.

The speed change mechanism 13 is an automatic stepped speed change mechanism that enables switching between a plurality of shift speeds with different speed ratios. The speed change mechanism 13 includes a gear mechanism such as a planetary gear mechanism, and a plurality of engagement devices (in this example, friction engagement devices) such as a clutch and a brake which engage or disengage a rotating element of the gear mechanism, in order to form the plurality of shift speeds. A wet multi-plate clutch etc. can be used as the plurality of engagement devices. In the present embodiment, the plurality of engagement devices include the second clutch C2, and include other clutches, brakes, etc. In the present embodiment, the second clutch C2 corresponds to the "second engagement device" in the present invention.

The speed change mechanism 13 shifts the rotational speed of the intermediate shaft M (shift input shaft) and converts the torque thereof, based on the speed ratio that has been set according to each shift speed that is formed according to the engagement states of the plurality of engagement devices for shifting, and transmits the shifted rotational speed and the converted torque to the output shaft O as an output shaft of the speed change mechanism 13 (shift output shaft). The "speed ratio" is the ratio of the rotational speed of the intermediate shaft M (shift input shaft) to that of the output shaft O (shift output shaft). The torque transferred from the speed change mechanism 13 to the output shaft O is distributed and transferred to the two right and left wheels 15 via an output differential gear unit 14. The drive device 1 can thus transfer the torque of one or both of the internal combustion engine 11 and the rotating electrical machine 12 to the wheels 15 to drive the vehicle 6.

In the present embodiment, the drive device 1 includes an oil pump (not shown) drivingly coupled to the intermediate shaft M. The oil pump is driven by the driving force of one or both of the rotating electrical machine 12 and the internal combustion engine 11 to operate, and generates an oil pressure. Oil from the oil pump is adjusted to a predetermined oil pressure by a hydraulic control device 25, and is then supplied to the first clutch C1, the second clutch C2, etc. The drive device 1 may include another oil pump having a dedicated drive motor, in addition to this oil pump.

As shown in FIG. 1, the vehicle 6 is provided with an input-shaft rotational speed sensor Se1, an intermediate-shaft rotational speed sensor Se2, and an output-shaft rotational-speed sensor Se3. The input-shaft rotational speed sensor Se1 is a sensor that detects the rotational speed of the input shaft I. The rotational speed of the input shaft I detected by the input-shaft rotational speed sensor Se1 is equal to that of the internal combustion engine 11.

The intermediate-shaft rotational speed sensor Se2 is a sensor that detects the rotational speed of the intermediate shaft M. The rotational speed of the intermediate shaft M is equal to that of the rotor of the rotating electrical machine 12, and is also equal to that of the shift input shaft. Accordingly, for example, a rotation sensor (resolver etc.) included in the rotating electrical machine 12 or a shift input sensor (pulse type detector etc.) included in the speed change mechanism 13 can be used as the intermediate-shaft rotational speed sensor Se2.

The output-shaft rotational speed sensor Se3 is a sensor that detects the rotational speed of the output shaft O. The rotational speed of the output shaft O is equal to that of the shift output shaft. Accordingly, for example, a shift output sensor (pulse type detector etc.) included in the speed change mechanism 13 can be used as the output-shaft rotational speed sensor Se3. The control device 40 derives the vehicle speed as the traveling speed of the vehicle 6, based on the rotational speed of the output shaft O detected by the output-shaft rotational speed sensor Se3.

2. Configuration of Control Device

As shown in FIG. 1, the control device 40 according to the present embodiment includes a drive-mode deciding unit 41, a requested-driving-force deciding unit 42, a rotating-electrical-machine control unit 43, a first-clutch operation control unit 44, a speed-change-mechanism operation control unit 45, a target-amount obtaining unit 51, a mode control unit 52, a target-amount determining unit 53, and a torque correction control unit 54. These function units can receive and send information from and to each other.

The control device 40 includes an arithmetic processing unit such as CPU as a core, and has a storage device such as RAM or ROM. Each function unit of the control device 40 is formed by one or both of software (program) stored in the ROM etc. and hardware provided separately such as an operational circuit. For those function units which are formed by a program, the arithmetic processing unit included in the control device 40 operates as a computer that executes the program.

As shown in FIG. 1, the vehicle 6 is provided with an internal-combustion-engine control device 30 that controls operation of the internal combustion engine 11. The internal-combustion-engine control device 30 and the control device 40 can receive and send information from and to each other. The internal-combustion-engine control device 30 controls the operating point of the internal combustion engine 11 (the internal-combustion-engine torque Te and the rotational speed) based on a command from the control device 40. The control device 40 can obtain information on the detection results of the input-shaft rotational speed sensor Set, the intermediate-shaft rotational speed sensor Se2, and the output-shaft rotational speed sensor Se3 described above, and can obtain information from a sensor that detects the operation amount of an accelerator pedal (not shown) (or accelerator operation amount), a sensor that detects the operation amount of a brake pedal (not shown), a sensor that detects the state of the electricity storage device 28 (the amount of stored electricity, temperature, etc.), etc.

2-1. Configuration of Drive-Mode Deciding Unit

The drive-mode deciding unit 41 is a function unit that decides the drive mode of the vehicle 6. The drive-mode deciding unit 41 decides the drive mode to be implemented by the drive device 1 by referring to a predetermined map (mode selection map), etc. based on, e.g., the vehicle speed, the accelerator operation amount, the amount of electricity stored in the electricity storage device 28, etc.

In the present embodiment, the drive modes that can be selected by the drive-mode deciding unit 41 include an electric drive mode and a parallel drive mode. In the electric drive mode, with the first clutch C1 in the disengagement state and with the second clutch C2 in the direct engagement state, the rotating electrical machine 12 basically performs power running to drive the vehicle 6 only by the output torque of the rotating electrical machine 12 (rotating-electrical-machine torque Tm). In the parallel drive mode, with both the first clutch C1 and the second clutch C2 in the direct engagement state, with one of the first clutch C1 and the second clutch C2 in the slip engagement state and the other in the direct engagement state, or with both the first clutch C1 and the second clutch C2 in the slip engagement state, the vehicle 6 is basically driven by at least the internal-combustion-engine torque Te.

The parallel drive mode includes a drive mode in which the rotating electrical machine 12 outputs torque (regenerative torque) in a negative direction (power generation direction) and electricity is generated by part of the internal-combustion-engine torque Te, in addition to a drive mode in which the rotating electrical machine 12 outputs torque in a positive direction (power-running direction) to supplement the driving force generated by the internal-combustion-engine torque Te.

Specifically, the parallel drive mode (power generation mode) in which the internal-combustion-engine torque Te is used to cause the rotating electrical machine 12 to generate electricity and the vehicle 6 is driven includes a first control mode, a second control mode, a third control mode, and a fourth control mode. In the first control mode, the rotating electrical machine 12 generates electricity with both the first clutch C1 and the second clutch C2 in the slip engagement state. In the second control mode, the rotating electrical machine 12 generates electricity with both the first clutch C1 and the second clutch C2 in the direct engagement state. In the third control mode, the rotating electrical machine 12 generates electricity with the first clutch C1 in the direct engagement state and with the second clutch C2 in the slip engagement state. In the fourth control mode, the rotating electrical machine 12 generates electricity with the first clutch C1 in the slip engagement state and with the second clutch C2 in the direct engagement state.

2-2. Configuration of Requested-Driving-Force Deciding Unit

The requested-driving-force deciding unit 42 is a function unit that decides a requested driving force Td that is requested to drive the wheels 15 to drive the vehicle 6. The requested-driving-force deciding unit 42 decides the requested driving force Td by referring to a predetermined map (requested-driving-force decision map), etc. based on the vehicle speed and the accelerator operation amount. The requested driving force Td thus decided is basically equal to a driving force that is required to implement the behavior according to driver's artificial operation (e.g., accelerator operation etc.). Based on the decided requested driving force Td, assigned driving forces that are respectively assigned to the internal combustion engine 11 and the rotating electrical machine 12 are decided so that the sum of the assigned driving forces becomes equal to the requested driving force Td. The internal-combustion-engine control device 30 controls the internal combustion engine 11 and the rotating-electrical-machine control unit 43 controls the rotating electrical machine 12 so that the assigned driving forces thus decided are transmitted to the wheels 15. Thus, the driving force of the same magnitude as the requested driving force Td is basically transmitted to the wheels 15.

When it is necessary to cause the rotating electrical machine 12 to generate electricity, the rotating-electrical-machine torque Tm is set to negative torque that is required to generate the requested amount of electricity (hereinafter referred to as the "requested regenerative torque"). In this case, since the driving force assigned to the rotating electrical machine 12 has a negative value, the driving force assigned to the internal combustion engine 11 has a value larger than the requested driving force Td.

2-3. Configuration of Rotating-Electrical-Machine Control Unit

The rotating-electrical-machine control unit 43 is a function unit that controls operation of the rotating electrical machine 12. The rotating-electrical-machine control unit 43 controls the operating point of the rotating electrical machine 12 (the rotating-electrical-machine torque Tm and the rotational speed) of the rotating electrical machine 12 by controlling the inverter device 27. In the present embodiment, the rotating-electrical-machine control unit 43 can switch between torque control and rotational speed control of the rotating electrical machine 12 according to the traveling state of the vehicle 6. The torque control is control in which target torque is set as a control target, and the rotating-electrical-machine torque Tm is caused to follow (to be closer to) the target torque. The rotational speed control is control in which a target rotational speed is set as a control target, and the rotating-electrical-machine torque Tm is controlled to cause the rotational speed of the rotating electrical machine 12 to follow the target rotational speed.

2-4. Configuration of First-Clutch Operation Control Unit

The first-clutch operation control unit 44 is a function unit that controls operation of the first clutch C1. The first-clutch operation control unit 44 controls operation of the first clutch C1 by controlling an oil pressure that is supplied to the first clutch C1 via the hydraulic control device 25, and controlling an engagement pressure of the first clutch C1. Specifically, the first clutch C1 is brought into the disengagement state by controlling the engagement pressure to less than the disengagement boundary pressure (e.g., disengagement pressure), and the first clutch C1 is brought into the direct engagement state by controlling the engagement pressure to the engagement boundary pressure or higher (e.g., full engagement pressure). The first clutch C1 is brought into the slip engagement state by controlling the engagement pressure to a slip engagement pressure that is equal to or higher than the disengagement boundary pressure and less than the engagement boundary pressure.

When the first clutch C1 is in the slip engagement state, the input shaft I and the intermediate shaft M rotate relative to each other, and the driving force is transmitted from the rotating shaft having a higher rotational speed toward the rotating shaft having a lower rotational speed. The maximum value of the torque (transfer torque capacity) that can be transferred when the first clutch C1 is in the direct engagement state or the slip engagement state is determined according to the engagement pressure of the first clutch C1 at that time. The magnitude of the torque (transfer torque) that is transferred by the first clutch C1 is equal to the transfer torque capacity in the slip engagement state. In the present embodiment, increase or decrease in engagement pressure and transfer torque capacity can be continuously controlled by continuously controlling the amount of oil and the magnitude of oil pressure that is supplied to the first clutch C1 by a proportional solenoid etc. according to an oil pressure command to the first clutch C1.

In the present embodiment, the first-clutch operation control unit 44 can switch between torque control and rotational speed control of the first clutch C1 according to the traveling state of the vehicle 6. The torque control is control in which a target transfer torque capacity is set as a control target, and the transfer torque capacity of the first clutch C1 is caused to follow the target transfer torque capacity. The rotational speed control is control in which a target differential rotational speed, a rotational speed of an input-side rotating member (input-side engagement member), or a rotational speed of an output-side rotating member (output-side engagement member) is set as a control target, and the engagement pressure (oil pressure) or the transfer torque capacity of the first clutch C1 is controlled to cause the rotational speed difference between the two engagement members that are engaged by the first clutch C1 (in this example, the rotational speed difference between the input shaft I and the intermediate shaft M), the rotational speed of the input-side rotating member (in this example, the input shaft I), or the rotational speed of the output-side rotating member (in this example, the intermediate shaft M) to follow the control target.

2-5. Configuration of Speed-Change-Mechanism Operation Control Unit

The speed-change-mechanism operation control unit 45 is a function unit that controls operation of the speed change mechanism 13. The speed-change-mechanism operation control unit 45 decides a target shift speed by referring to a predetermined map (shift map), etc. based on the accelerator operation amount and the vehicle speed. The speed-change-mechanism operation control unit 45 controls, based on the decided target shift speed, an oil pressure that is supplied to a predetermined clutch, brake, etc. included in the speed change mechanism 13, thereby forming the target shift speed.

In this example, the second clutch C2 included in the speed change mechanism 13 cooperates with the brake included in the speed change mechanism 13 to form a first shift speed as a shift speed having a maximum speed ratio. In the speed-change-mechanism operation control unit 45, a function unit that controls operation of the second clutch C2 is herein referred to as the second-clutch operation control unit 45a. The second-clutch operation control unit 45a controls an oil pressure that is supplied to the second clutch C2 via the hydraulic control device 25, and controls operation of the second clutch C2 by controlling the engagement pressure of the second clutch C2. The operation control of the second clutch C2 by the second-clutch operation control unit 45a is basically similar to that of the first clutch C1 by the first-clutch operation control unit 44 except the object to be controlled and matters associated therewith.

2-6. Configuration of Target-Amount Obtaining Unit

The target-amount obtaining unit 51 is a function unit that obtains a target amount B as a physical amount regarding the heat generation state of the engagement device. Specifically, the target-amount obtaining unit 51 obtains at least one of the temperature and the heat generation amount of the second clutch C2 as a selection target amount B0. In the present embodiment, the target-amount obtaining unit 51 further obtains at least one of the temperature and the heat generation amount of the first clutch C1 as a first determination target amount B1, and obtains at least one of the temperature and the heat generation amount of the second clutch C2 as a second determination target amount B2. The selection target amount B0 and the second determination target amount B2 may be either the same physical amount or different physical amounts from each other.

The temperature of the first clutch C1 or the second clutch C2 can be obtained based on the detection result of a temperature sensor (not shown). The heat generation amount when the first clutch C1 or the second clutch C2 is in the slip engagement state may be obtained based on the rotational speed difference between the two engagement devices that are engaged by the clutch, and the transfer torque capacity of the clutch (e.g., based on the product of the rotational speed difference and the transfer torque capacity). The temperature of the clutch may be obtained based on the heat generation amount of the clutch (e.g., based on the integrated value of the heat generation amount).

2-7. Configuration of Target-Amount Determining Unit

The target-amount determining unit 53 is a function unit that compares the target amount B obtained by the target-amount obtaining unit 51 with a reference value D of the target amount B (determination reference value) to determine if the target amount B is smaller than the reference value D. In the present embodiment, since the target-amount obtaining unit 51 obtains three target amounts B, namely the selection target amount B0, the first determination target amount B1, and the second determination target amount B2, the target-amount determining unit 53 determines if each of the three target amounts B is smaller than the reference value D.

Specifically, the target-amount determining unit 53 determines if the selection target amount B0 is smaller than a predetermined selection reference value D0 as the reference value D for the selection target amount B0. The target-amount determining unit 53 also determines if the first determination target amount B1 is smaller than a predetermined first determination reference value D1 as the reference value D for the first determination target amount B1, and determines if the second determination target amount B2 is smaller than a predetermined second determination reference value D2 as the reference value D for the second determination target amount B2. In the present embodiment, the target-amount determining unit 53 further determines if the first determination target amount B1 is smaller than a predetermined third determination reference value D3 as the reference value D for the first determination target amount B1.

The selection reference value D0 and the second determination reference value D2 are set according to, e.g., the heat resistance of the second clutch C2 etc., and the selection reference value D0 can be the same value as the second determination reference value D2. Similarly, the first determination reference value D1 and the third determination reference value D3 are set according to, e.g., the heat resistance of the first clutch C1 etc., and the first determination reference value D1 can be the same value as the third determination reference value D3. In a specific example of FIG. 8 described later, all the target amounts B (B0, B1, B-2) are temperatures, and all the reference values D (D0, D1, D2, D3) are different from each other. Specifically, the second determination reference value D2 is set to a value larger than the selection reference value D0, and the third determination reference value D3 is set to a value larger than the first determination reference value D1. The reference values are the selection reference value D0, the first determination reference value D1, the second determination reference value D2, and the third determination reference value D3 in ascending order (D0<D1<D2<D3).

In the case where the target amount B is both the temperature and the heat generation amount, the reference value D for the target amount B is set for each of the temperature and the heat generation amount. In this case, it may be determined that the target amount B is equal to or larger than the reference value D if both the temperature and the heat generation amount are equal to or larger than the respective reference values D, or it may be determined that the target value B is equal to or larger than the reference value D if at least one of the temperature and the heat generation amount is equal to or larger than the corresponding reference value D.

2-8. Configuration of Mode Control Unit

The mode control unit 52 is a function unit that implements each mode by cooperatively controlling other function units such as the first-clutch operation control unit 44 and the second-clutch operation control unit 45a to switch the drive mode that is decided by the drive-mode deciding unit 41. Since the drive modes that can be selected by the drive-mode deciding unit 41 include the first control mode, the second control mode, the third control mode, and the fourth control mode as described above, the mode control unit 52 can switch among the first control mode, the second control mode, the third control mode, and the fourth control mode.

Control that is performed by the mode control unit 52 includes control (first mode shift control) for implementing a first mode shift (see specific examples of FIGS. 6 to 8 described later) as a mode shift from the first control mode to the second control mode, and control (second mode shift control) for implementing a second mode shift (see specific examples of FIGS. 9 and 10 described later) as a mode shift from the second control mode to the first control mode.

In a mode shift of at least one (in this example, both) of the first mode shift and the second mode shift, the mode control unit 52 executes the mode shift via the third control mode if the selection target amount B0 is less than the selection reference value D0, and executes the mode shift via the fourth control mode if the selection target amount B0 is equal to or larger than the selection reference value D0. According to the present embodiment, whether the mode shift is executed via the third control mode or the fourth control mode is determined based on the selection target amount B0 at the time execution of the first mode shift control and the second mode shift control is started.

2-8-1. Procedures of First Mode Shift Control

Figure 2:
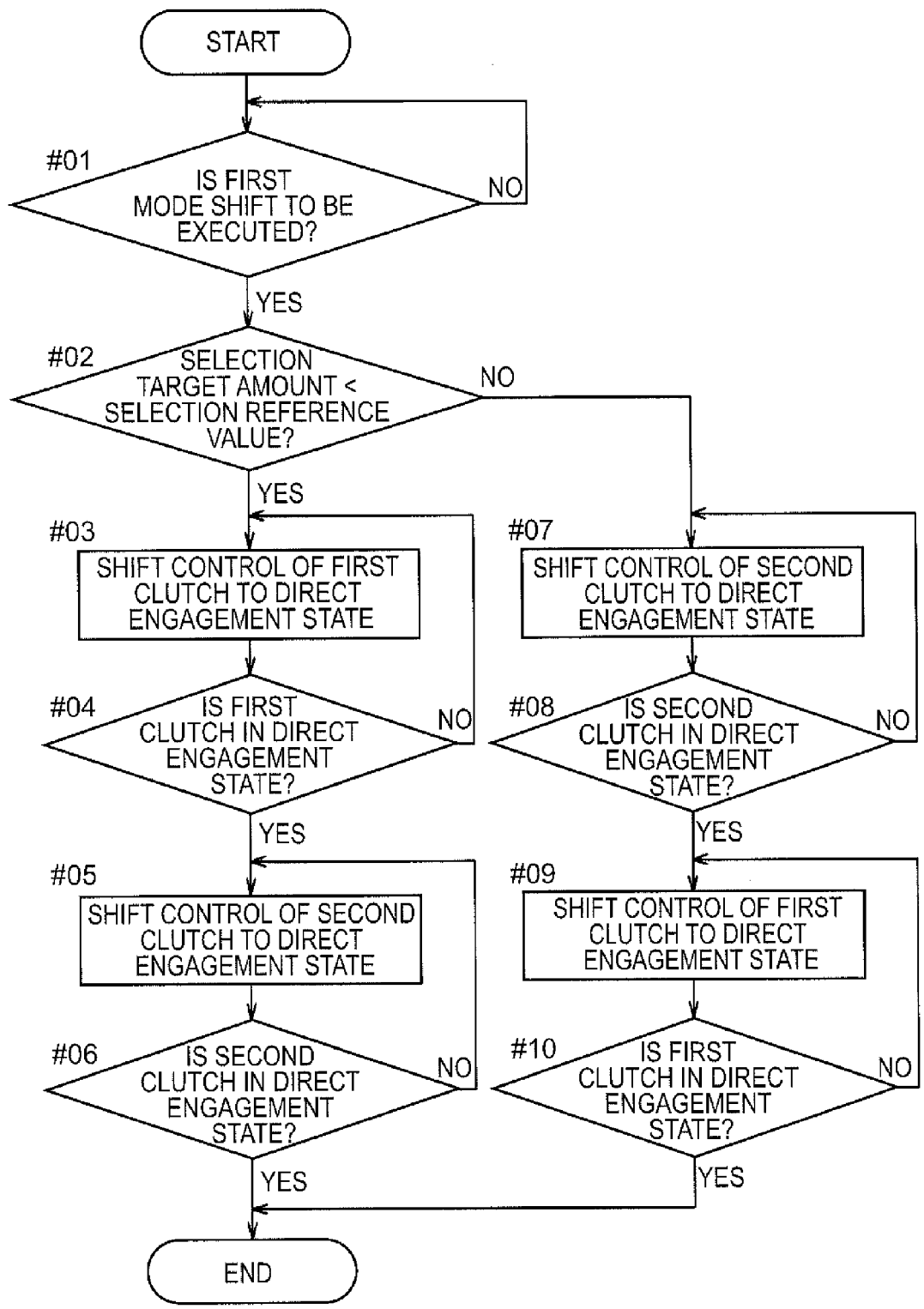
FIG. 2 is a flowchart showing procedures of first mode shift control according to the embodiment of the present invention.

The procedures of the first mode shift control that is executed mainly by the mode control unit 52 will be described with reference to the flowchart of FIG. 2. Since the first control mode is being implemented at the time execution of the first mode shift control is started, both the first clutch C1 and the second clutch C2 are in the slip engagement state.

If it is determined that the shift (first mode shift) from the first control mode in which both the first clutch C1 and the second clutch C2 are in the slip engagement state to the second control mode in which both the first clutch C1 and the second clutch C2 are in the direct engagement state is to be executed (step #01: Yes), the target-amount determining unit 53 determines if the selection target amount B0 is smaller than the selection reference value D0 (step #02). If it is determined by the target-amount determining unit 53 that the selection target amount B0 is smaller than the selection reference value D0 (step 02: Yes), control for shifting the first clutch C1 to the direct engagement state is started (step #03). This shift control is continued (step #03) until the first clutch C1 is shifted to the direct engagement state (step #04: No). The shift from the first control mode to the third control mode is completed when the first clutch C1 is shifted to the direct engagement state (step #04: Yes).

After the shift to the third control mode is completed, control for shifting the second clutch C2 to the direct engagement state is started (step #05). This shift control is continued (step #05) until the second clutch C2 is shifted to the direct engagement state (step #06: No). The shift from the third control mode to the second control mode is completed when the second clutch C2 is shifted to the direct engagement state (step #06: Yes). The first mode shift control is thus terminated.

If it is determined by the target-amount determining unit 53 that the selection target amount B0 is equal to or larger than the selection reference value D0 (step 02: No), the processing (steps #07 to #10) is sequentially performed with the first clutch C1 and the second clutch C2 in the steps #03 to #06 being switched, thereby executing the shift from the first control mode to the second mode via the fourth control mode.

As described above, in the first mode shift control, the shift of the first clutch C1 from the slip engagement state to the direct engagement state and the shift of the second clutch C2 from the slip engagement state to the direct engagement state are executed. If the selection target amount B0 is smaller than the selection reference value D0, the shift to the direct engagement state is executed in order of the first clutch C1 and the second clutch C2. If the selection target amount B0 is equal to or larger than the selection reference value D0, the shift to the direct engagement state is executed in order of the second clutch C2 and the first clutch C1. Accordingly, when the first mode shift control is executed, the time during which the first clutch C1 is in the slip engagement state (hereinafter referred to as the "slip time") is shorter than the slip time of the second clutch C2 if the selection target amount B0 is smaller than the selection reference value D0, and is longer than the slip time of the second clutch C2 if the selection target amount B0 is equal to or larger than the selection reference value D0.

2-8-2. Procedures of Second Mode Shift Control

Figure 3:
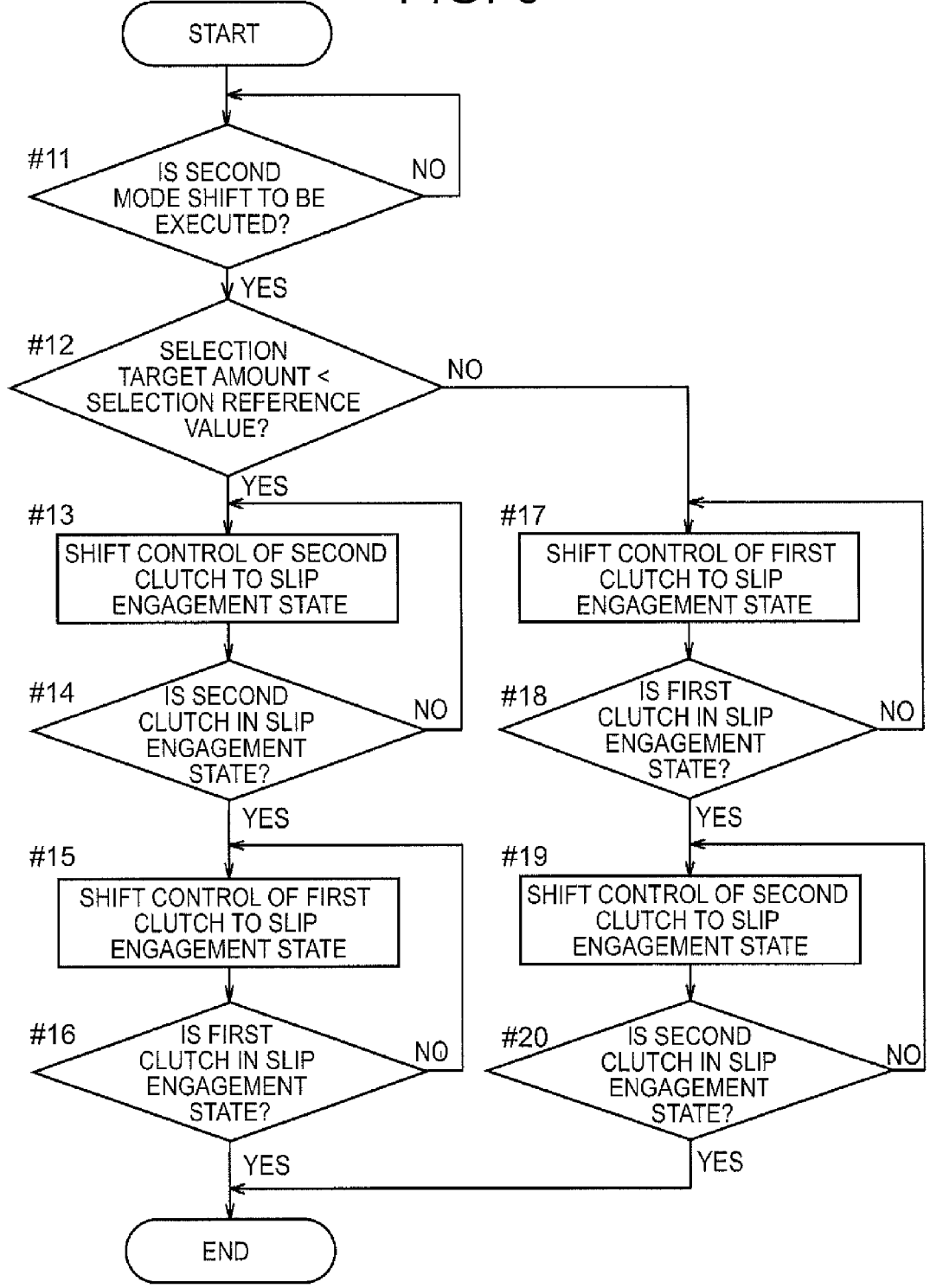
FIG. 3 is a flowchart showing procedures of second mode shift control according to the embodiment of the present invention.

The procedures of the second mode shift control that is executed mainly by the mode control unit 52 will be described with reference to the flowchart of FIG. 3. Since the second control mode is being implemented at the time execution of the second mode shift control is started, both the first clutch C1 and the second clutch C2 are in the direct engagement state.

If it is determined that the shift (second mode shift) from the second control mode in which both the first clutch C1 and the second clutch C2 are in the direct engagement state to the first control mode in which both the first clutch C1 and the second clutch C2 are in the slip engagement state is to be executed (step #11: Yes), the target-amount determining unit 53 determines if the selection target amount B0 is smaller than the selection reference value D0 (step #12). If it is determined by the target-amount determining unit 53 that the selection target amount B0 is smaller than the selection reference value D0 (step #12: Yes), control for shifting the second clutch C2 to the slip engagement state is started (step #13). This shift control is continued (step #13) until the second clutch C2 is shifted to the slip engagement state (step #14: No). The shift from the second control mode to the third control mode is completed when the second clutch C2 is shifted to the slip engagement state (step #14: Yes).

After the shift to the third control mode is completed, control for shifting the first clutch C1 to the slip engagement state is started (step #15). This shift control is continued (step #15) until the first clutch C1 is shifted to the slip engagement state (step #16: No). The shift from the third control mode to the first control mode is completed when the first clutch C1 is shifted to the slip engagement state (step #16: Yes). The second mode shift control is thus terminated.

If it is determined by the target-amount determining unit 53 that the selection target amount B0 is equal to or larger than the selection reference value D0 (step 12: No), the processing (steps #17 to #20) is sequentially performed with the first clutch C1 and the second clutch C2 in the steps #13 to #16 being switched as shown in FIG. 3, thereby executing the shift from the second control mode to the first mode via the fourth control mode.

As described above, in the second mode shift control, the shift of the first clutch C1 from the direct engagement state to the slip engagement state and the shift of the second clutch C2 from the direct engagement state to the slip engagement state are executed. If the selection target amount B0 is smaller than the selection reference value D0, the shift to the slip engagement state is executed in order of the second clutch C2 and the first clutch C1. If the selection target amount B0 is equal to or larger than the selection reference value D0, the shift to the slip engagement state is executed in order of the first clutch C1 and the second clutch C2. Accordingly, when the second mode shift control is executed, the slip time of the first clutch C1 is shorter than that of the second clutch C2 if the selection target amount B0 is smaller than the selection reference value D0, and is longer than that of the second clutch C2 if the selection target amount B0 is equal to or larger than the selection reference value D0, as in the case where the first mode shift control is executed.

2-9. Configuration of Torque Correction Control Unit

The torque correction control unit 54 is a function unit that executes torque correction control. In this torque correction control, torque reduction control is executed in which the internal-combustion-engine torque Te is reduced when predetermined conditions are satisfied. In the present embodiment, the torque correction control unit 54 executes in parallel two kinds of torque correction control, namely first torque correction control and second torque correction control.

Figure 4:
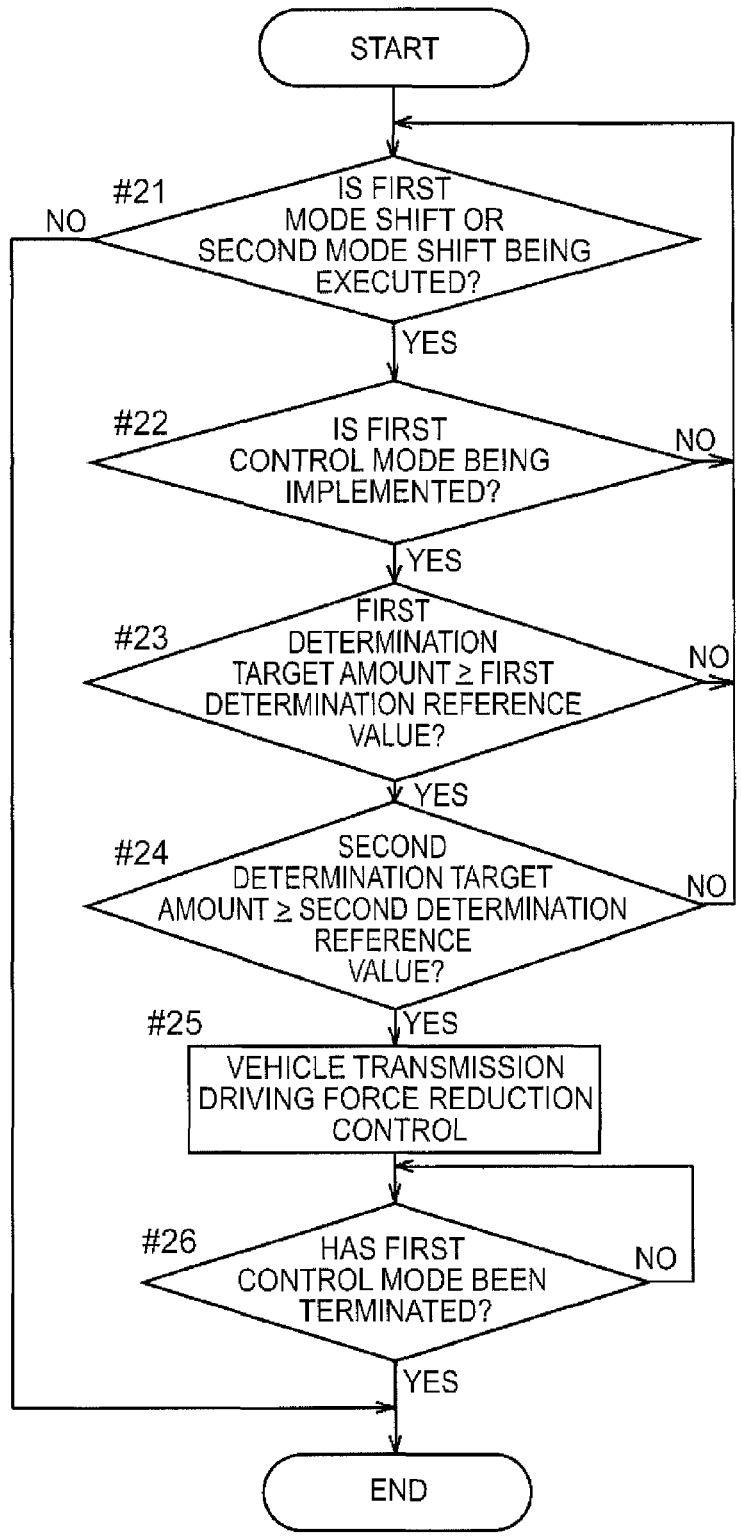
FIG. 4 is a flowchart showing procedures of first torque correction control according to the embodiment of the present invention.

The first torque correction control will be described with reference to the flowchart of FIG. 4. In the first torque correction control, wheel transmission driving force reduction control is executed as torque reduction control (step #25) if the first determination target amount B1 is equal to or larger than the first determination reference value D1 (step #23: Yes) and the second determination target amount B2 is equal to or larger than the second determination reference value D2 (step #24: Yes) in the first control mode (step #22: Yes). As can be seen from the processing of steps #21 and #26, in this example, the first torque correction control is executed during execution of the first mode shift or the second mode shift (step #21: Yes), and the wheel transmission driving force reduction control is executed at most once during the period during which the first control mode is continuously implemented. In this example, the first determination target amount B1 and the second determination target amount B2 are repeatedly obtained by the target-amount obtaining unit 51 while the first control mode is being implemented.

As used herein, the wheel transmission driving force reduction control is control of reducing the internal-combustion-engine torque Te so that the driving force that is transmitted to the wheels 15 (hereinafter referred to as the "wheel transmission driving force") becomes smaller than the requested driving force Td decided by the requested-driving-force deciding unit 42. In the specific example of FIG. 8 described later, the wheel transmission driving force reduction control is executed at time T23, whereby the wheel transmission driving force is reduced from the requested driving force Td according to the amount of reduction in internal-combustion-engine torque Te.

In the state before execution of the wheel transmission driving force reduction control, the internal-combustion-engine torque Te and the rotating-electrical-machine torque Tm are basically controlled so that the wheel transmission driving force becomes equal to the requested driving force Td. That is, in the state before execution of the wheel transmission driving force reduction control, including the case where the first determination target amount B1 is smaller than the first determination reference value D1 and the second determination target amount B2 is smaller than the second determination reference value D2, the requested driving force Td decided by the requested driving force deciding unit 42 is transmitted to the wheels 15.

Figure 5:
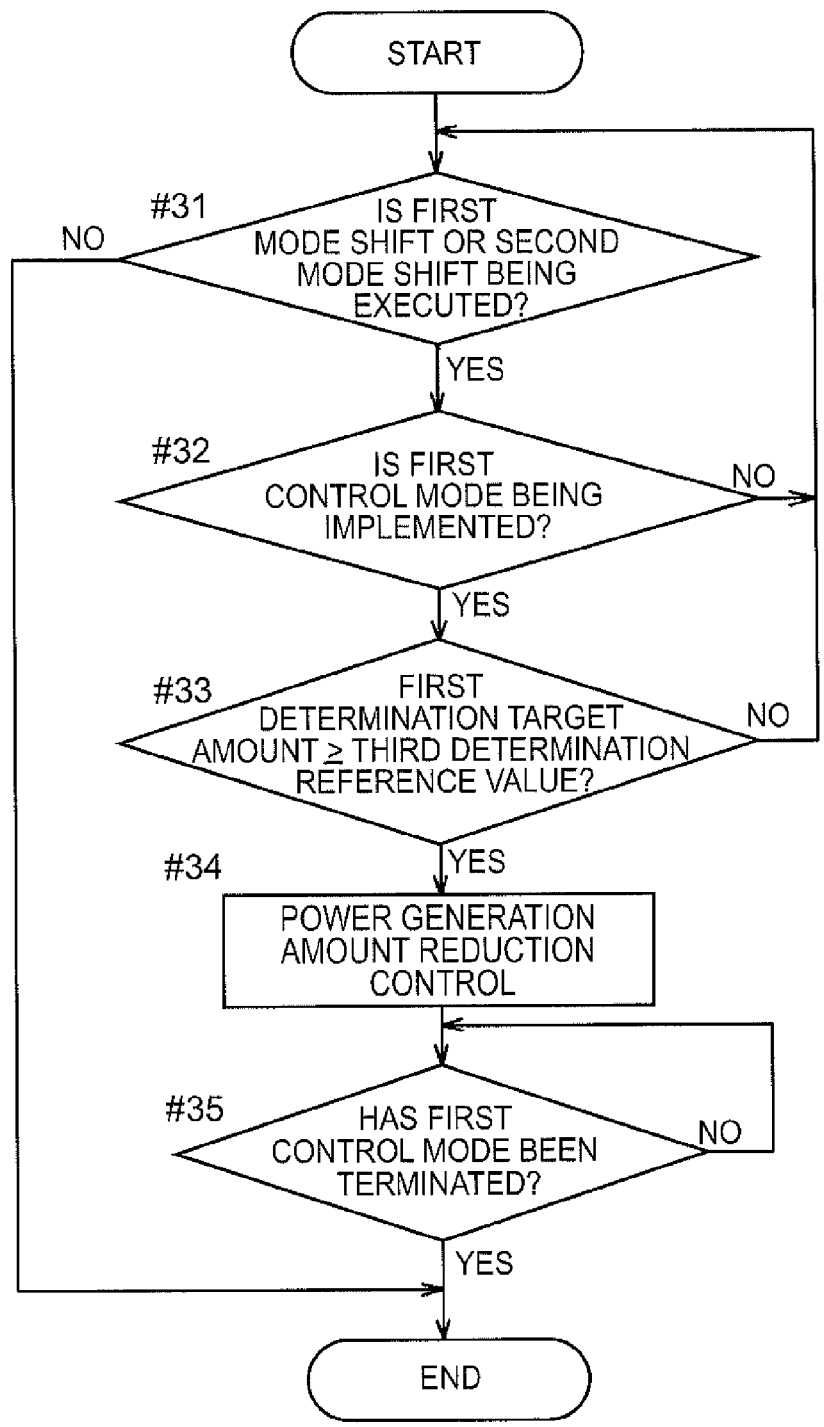
FIG. 5 is a flowchart showing procedures of second torque correction control according to the embodiment of the present invention.

The second torque correction control will be described with reference to the flowchart of FIG. 5. In the second torque correction control, power generation amount reduction control is executed as torque reduction control (step #34) if the first determination target amount B1 is equal to or larger than the third determination reference value D3 (step #33: Yes) in the first control mode (step #32: Yes). As can be seen from the processing of steps #31 and #35, in this example, the second torque correction control is executed during execution of the first mode shift or the second mode shift (step #31: Yes), and the power generation amount reduction control is executed at most once during the period during which the first control mode is continuously implemented. In this example, the first determination target amount B1 is repeatedly obtained by the target-amount obtaining unit 51 while the first control mode is being implemented.

Figure 8:
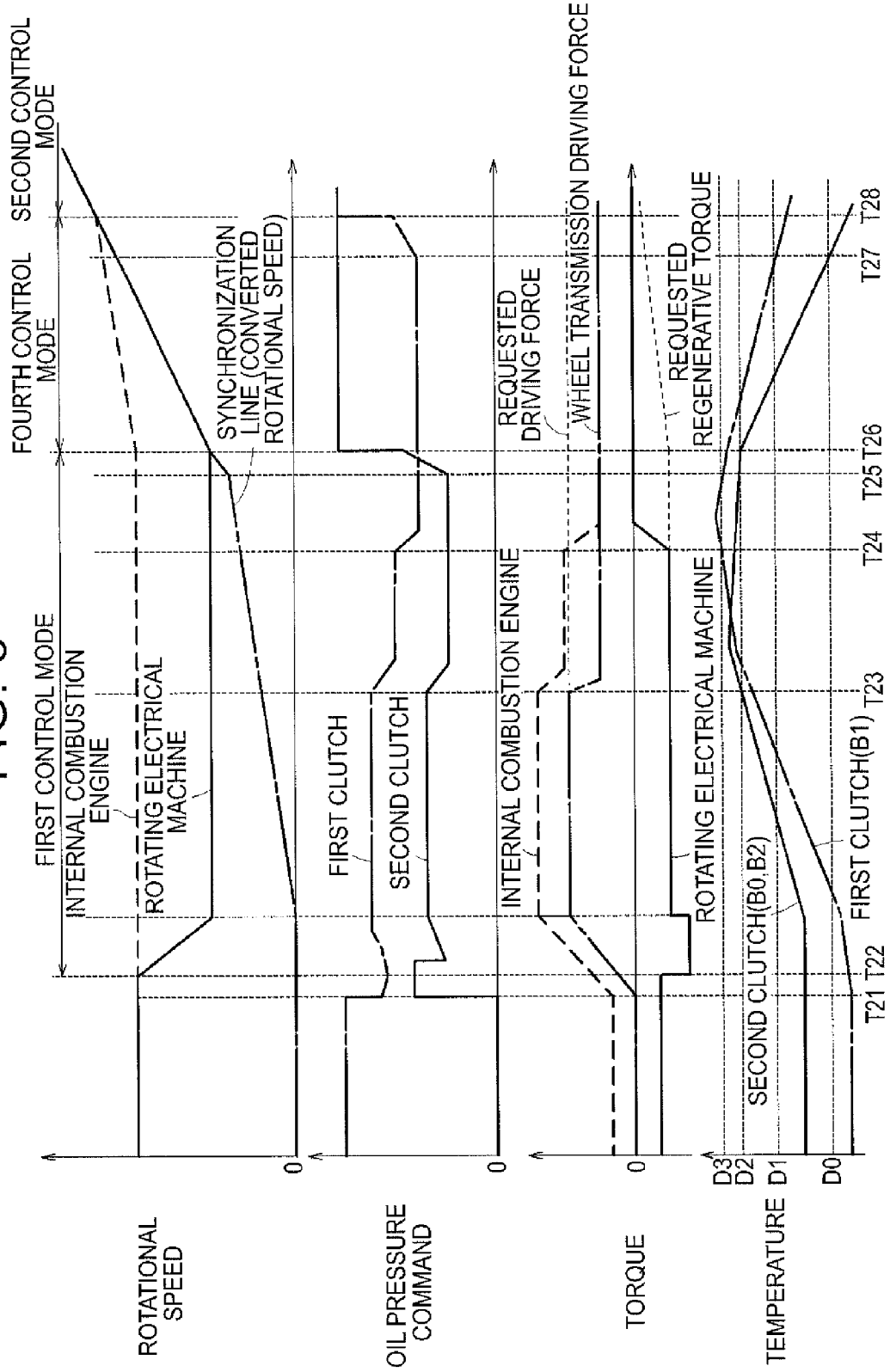
FIG. 8 is a timing chart showing a third specific example of the first mode shift according to the embodiment of the present invention.

As used herein, the power generation amount reduction control is control of reducing the rotating-electrical-machine torque Tm (more precisely, the absolute value of the rotating-electrical-machine torque Tm) to reduce the power generation amount by the rotating electrical machine 12 and to reduce the internal-combustion-engine torque Te according to the amount of reduction in rotating-electrical-machine torque Tm. In the specific example of FIG. 8 described later, the power generation amount reduction control is executed at time T24, whereby the internal-combustion-engine torque Te is reduced according to the amount of reduction (the amount of reduction in absolute value) in rotating-electrical-machine torque Tm from the requested regenerative torque. In the example of FIG. 8, since the rotating-electrical-machine torque Tm is controlled to zero by the power generation amount reduction control, the amount of reduction in rotating-electrical-machine torque Tm from the requested regenerative torque is equal to the magnitude of the requested regenerative torque.

Even in the state where the rotating-electrical-machine torque Tm is controlled to zero by execution of the power generation amount reduction control as in the specific example of FIG. 8, the drive mode is regarded as the mode in which the rotating electrical machine 12 generates electricity, in the case where power generation by the rotating electrical machine 12 continues to be requested due to, e.g., reduction in amount of electricity stored in the electricity storage device 28 etc. (that is, in the case where the requested regenerative torque is still set even after power generation is stopped). That is, in the example shown in FIG. 8, the requested regenerative torque continues to be set even after the power generation amount reduction control is executed at time T24, and the drive mode is the power generation mode even after time T24.

3. Specific Contents of First Mode Shift

Specific examples of the first mode shift that is executed in the control device 40 having the above configuration will be sequentially described with reference to the timing charts of FIGS. 6 to 8. In each timing chart, the "synchronization line (converted rotational speed)" represents the rotational speed that is obtained by converting the rotational speed of the output shaft O to the rotational speed of the intermediate shaft M on the assumption that a shift speed (in this example, first speed) is formed in the speed change mechanism 13, and the "requested driving force" is shown by the requested driving force Td divided by the speed ratio corresponding to this shift speed.

3-1. First Specific Example of First Mode Shift

Figure 6:
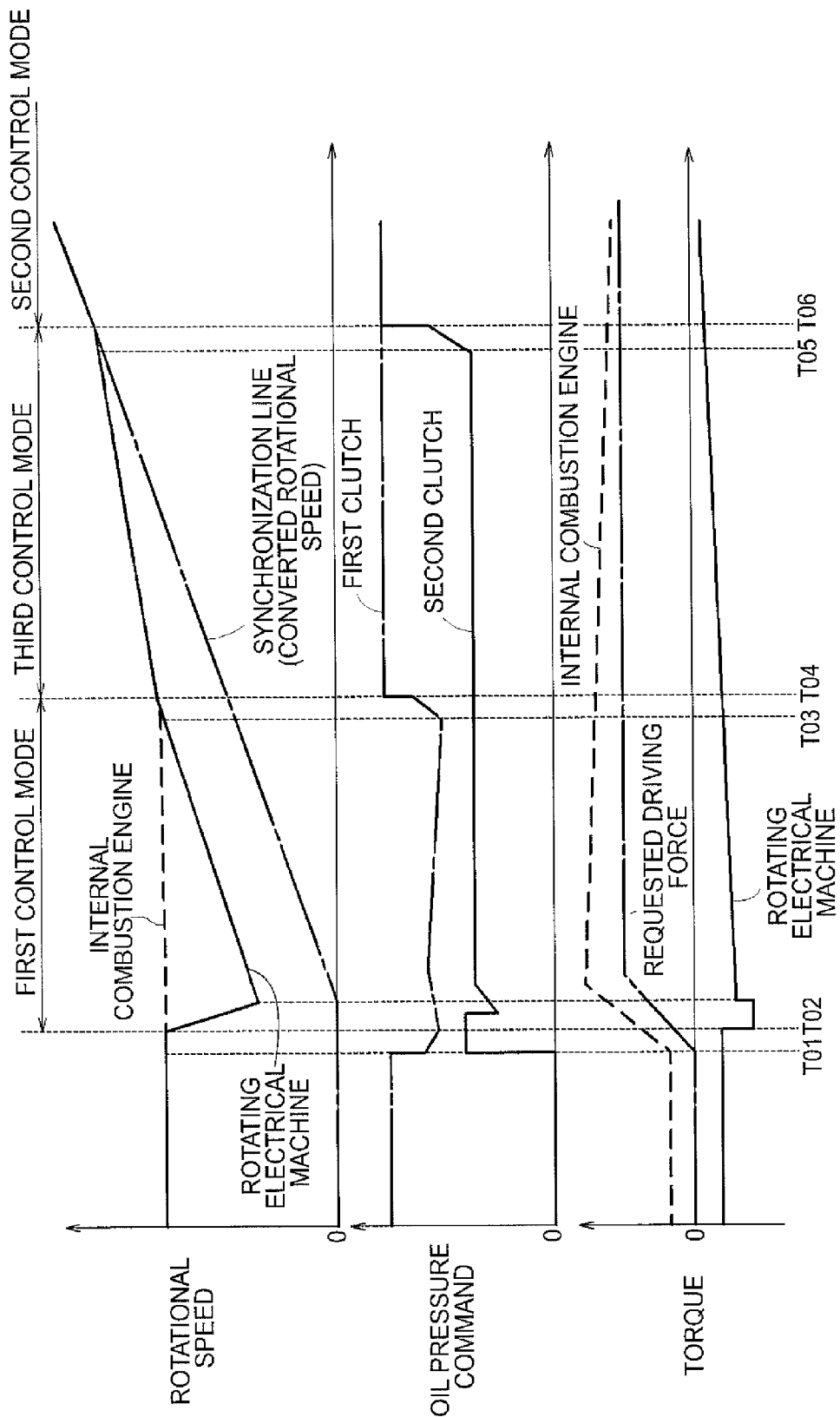
FIG. 6 is a timing chart showing a first specific example of a first mode shift according to the embodiment of the present invention.

This specific example is a specific example of the first mode shift that is executed when starting the vehicle 6 from the state where the vehicle 6 is stopped (the converted rotational speed is zero) and electricity is generated by the rotating electrical machine 12, as shown in FIG. 6. Similar control can be executed in the case where the vehicle 6 is traveling when execution of the first mode shift control is started (the same applies to FIGS. 7 and 8).

In the initial state (up to time T01), the vehicle 6 is stopped, and the rotating electrical machine 12 is generating electric power by the internal-combustion-engine torque Te with the first clutch C1 in the direct engagement state and the second clutch C2 in the disengagement state. If vehicle starting conditions for starting the vehicle 6 are satisfied at time T01, control is executed in which both the engagement pressure of the first clutch C1 and the engagement pressure of the second clutch C2 are controlled to the slip engagement pressure (time T01 to T02). The vehicle starting conditions may be, e.g., the conditions that are satisfied when the operation of stepping on the accelerator pedal by the driver, the operation of releasing the brake pedal by the driver, etc. is detected. The first mode shift control is started if the drive mode is shifted to the first control mode (time T02).

Although not shown in the figure, in this example, the selection target amount B0 is smaller than the selection reference value D0 at the time execution of the first mode shift control is started (time T02), and the first mode shift via the third control mode is executed. Although not shown in the figure, it is assumed in this example that the conditions for executing the wheel transmission driving force reduction control (steps #23, #24 in FIG. 4) or the conditions for executing the power generation amount reduction control (step #33 in FIG. 5) are not satisfied while the first control mode is being implemented.

In the first control mode that is implemented at time T02 to T04, the second clutch C2 in the slip engagement state is controlled by the torque control based on the target transfer torque capacity. In this case, the target transfer torque capacity is set according to the position of the second clutch C2 on the power transmission path so that the requested driving force Td is transmitted to the wheels 15. In the first control mode, the first clutch C1 in the slip engagement state is controlled (rotational speed control) by rotational speed feedback control so that the rotational speed of the internal combustion engine 11 follows the target rotational speed. In this case, the target rotational speed is set to a value equal to or higher than the lower limit rotational speed at which the internal combustion engine 11 can continue self-sustained operation (e.g., the idling rotational speed or a value higher than the idling rotational speed). In this example, the target rotational speed is set to the rotational speed of the internal combustion engine 11 at the time the first control mode is started (time T02), and the target rotational speed is held at this rotational speed while the first control mode is being implemented.

In the first control mode, the rotating electrical machine 12 is controlled by the rotational speed control based on the target rotational speed. In this case, the target rotational speed is set to a value that is higher than the converted rotational speed and lower than the rotational speed of the internal combustion engine 11, and that can secure a requested power generation amount even if the rotational speed is reduced to a lowest value. In this example, this target rotational speed is set so that the difference from the converted rotational speed becomes constant. Accordingly, as shown in FIG. 6, the rotational speed difference between the internal combustion engine 11 and the rotating electrical machine 12 decreases as the vehicle speed (converted rotational speed) increases. The rotating-electrical-machine torque Tm is set based on the requested power generation amount divided by the target rotational speed (requested regenerative torque).

If the rotational speed difference between the internal combustion engine 11 and the rotating electrical machine 12 becomes equal to or less than a predetermined synchronization determination reference value at time T03, the engagement pressure of the first clutch C1 is increased toward the full engagement pressure. The first clutch C1 is shifted to the direct engagement state at time T04, whereby the drive mode is shifted from the first control mode to the third control mode. The control that is executed at time T02 to T04 corresponds to the control of shifting the first clutch C1 to the direct engagement state, which is executed in step #03 of FIG. 2 described above.

In the third control mode that is implemented at time T04 to T06, the second clutch C2 in the slip engagement state is controlled by the torque control as in the case where the first control mode is implemented. Although the rotating electrical machine 12 is also controlled by the rotational speed control as in the case where the first control mode is implemented, the target rotational speed in this case is set so that the difference from the converted rotational speed decreases gradually. If the difference between the rotational speed of the rotating electrical machine 12 and the converted rotational speed becomes equal to or less than the predetermined synchronization determination reference value at time T05, the engagement pressure of the second clutch C2 is increased toward the full engagement pressure. The second clutch C2 is shifted to the direct engagement state at time 106, whereby the drive mode is shifted from the third control mode to the second control mode. The control that is executed at time T04 to T06 corresponds to the control of shifting the second clutch C2 to the direct engagement state, which is executed in step #05 of FIG. 2 described above.

As described above, in this example, the first clutch C1 is shifted to the direct engagement state (time T03 to T04) with the second clutch C2 in the slip engagement state. This can suppress transmission of engagement shock associated with this shift to the wheels 15. In this example, the rotating electrical machine 12 is caused to generate electricity with the first clutch C1 in the slip engagement state only while the first control mode is being implemented. This can reduce energy loss due to torque transmission via the first clutch C1 and can enhance power generation efficiency.

3-2. Second Specific Example of First Mode Shift

Figure 7:
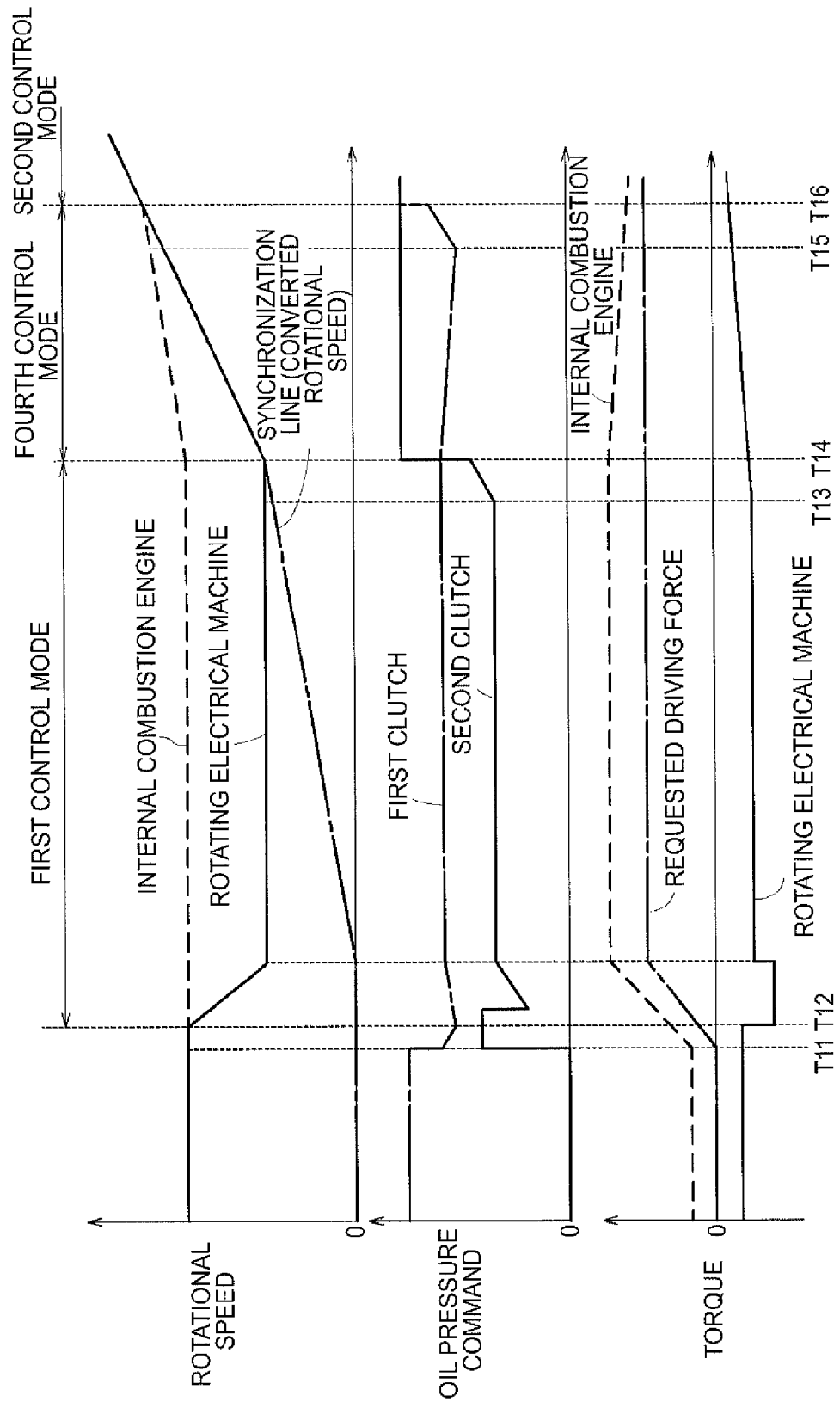
FIG. 7 is a timing chart showing a second specific example of the first mode shift according to the embodiment of the present invention.

As shown in FIG. 7, this specific example is a specific example of the first mode shift via the fourth control mode, unlike the first specific example (FIG. 6). This specific example will be described mainly with respect to the differences from the first specific example. This specific example is similar to the first specific example regarding the points that are not particularly described.

The drive mode is shifted to the first control mode at time T12, whereby the first mode shift control is started. In this example, although not shown in the figure, the selection target amount B0 is equal to or larger than the selection reference value D0 at the time execution of the first mode shift control is started (time T12), and the first mode shift via the fourth control mode is executed.

In the first control mode that is implemented at time T12 to T14, the target rotational speed of the rotating electrical machine 12 is set to a constant value. Accordingly, the difference between the rotational speed of the rotating electrical machine 12 and the converted rotational speed decreases as the vehicle speed (converted rotational speed) increases. If the difference between the rotational speed of the rotating electrical machine 12 and the converted rotational speed becomes equal to or less than the predetermined synchronization determination reference value at time T13, the engagement pressure of the second clutch C2 is increased toward the full engagement pressure. The second clutch C2 is shifted to the direct engagement state at time T14, whereby the drive mode is shifted from the first control mode to the fourth control mode. The control that is executed at time T12 to T14 corresponds to the control of shifting the second clutch C2 to the direct engagement state, which is executed in step #07 of FIG. 2 described above.

In the fourth control mode that is implemented at time T14 to T16, the first clutch C1 in the slip engagement state is controlled by the rotational speed control as in the case where the first control mode is implemented. The target rotational speed of the rotating electrical machine 12 is set so that the difference from the rotational speed of the internal combustion engine 11 decreases gradually. If the rotational speed difference between the internal combustion engine 11 and the rotating electrical machine 12 becomes equal to or less than the predetermined synchronization determination reference value at time T15, the engagement pressure of the first clutch C1 is increased toward the full engagement pressure. The first clutch C1 is shifted to the direct engagement state at time T16, whereby the drive mode is shifted from the fourth control mode to the second control mode. The control that is executed at time T14 to T16 corresponds to the control of shifting the first clutch C1 to the direct engagement state, which is executed in step #09 of FIG. 2 described above.

As described above, in this example, the rotating electrical machine 12 is caused to generate electricity with the second clutch C2 in the slip engagement state only while the first control mode is being implemented. This can suppress an excessive increase in temperature of the second clutch C2.

3-3. Third Specific Example of First Mode Shift

As shown in FIG. 8, this specific example is the same as the second specific example (FIG. 7) in that this specific example is a specific example of the first mode shift via the fourth control mode, but is different from the second specific example in that the wheel driving force reduction control and the power generation amount reduction control are executed while the first control mode is being implemented. This specific example will be described mainly with respect to the differences from the second specific example. This specific example is similar to the first and second specific examples regarding the points that are not particularly described.

In this example, all the target amounts B (B0, B1, B2) are temperature. Since the selection target amount B0 is equal to or larger than the selection reference value D0 upon execution of the first mode shift (time T22), the first mode shift via the fourth control mode is executed. The control is executed as in the second specific example while the first control mode is being implemented. However, in this example, the first determination target amount B1 is equal to or larger than the first determination reference value D1 and the second determination target amount B2 is equal to or larger than the second determination reference value D2 at time T23. Accordingly, the wheel transmission driving force reduction control is executed, and the internal-combustion-engine torque Te is reduced so that the wheel transmission driving force becomes smaller than the requested driving force Td. In this case, since the rotating-electrical-machine torque Tm is held constant, the wheel transmission driving force decreases from the requested driving force Td according to the amount of reduction in internal-combustion-engine torque Te.

In this example, the first determination target amount B1 becomes equal to or higher than the third determination reference value D3 at time T24. Thus, the power generation amount reduction control is executed to reduce the rotating-electrical-machine torque Tm (more precisely, the absolute value of the rotating-electrical-machine torque Tm) from the requested regenerative torque and to reduce the internal-combustion-engine torque Te according to the amount of reduction in rotating-electrical-machine torque Tm. In this case, the wheel transmission driving force does not change before and after execution of the power generation amount reduction control. The rotating electrical machine 12 may continue to generate electricity by the rotating-electrical-machine torque Tm reduced by the power generation amount reduction control. However, in this example, power generation by the rotating electrical machine 12 is stopped by controlling the rotating-electrical-machine torque Tm to zero by the power generation amount reduction control. Thereafter, control similar to that of the second specific example is executed. Time T25, T26, T27, T28 in this example corresponds to time T13, T14, T15, T16 in the second specific example (FIG. 7), respectively.

The second specific example is described with respect to an example in which both the wheel transmission driving force reduction control and the power generation amount reduction control are executed. However, only the wheel transmission driving force reduction control is executed if the first determination target amount B1 does not become equal to or larger than the third determination reference value D3 while the first control mode is being implemented. In the configuration in which the first determination reference value D1 is set to a value larger than the third determination reference value D3, only the power generation amount reduction control rather than both the wheel transmission driving force reduction control and the power generation amount reduction control may be executed while the first control mode is being implemented.

4. Specific Contents of Second Mode Shift

Specific examples of the second mode shift that is executed in the control device 40 will be described below with reference to the timing charts of FIGS. 9 and 10.

4-1. First Specific Example of Second Mode Shift

Figure 9:
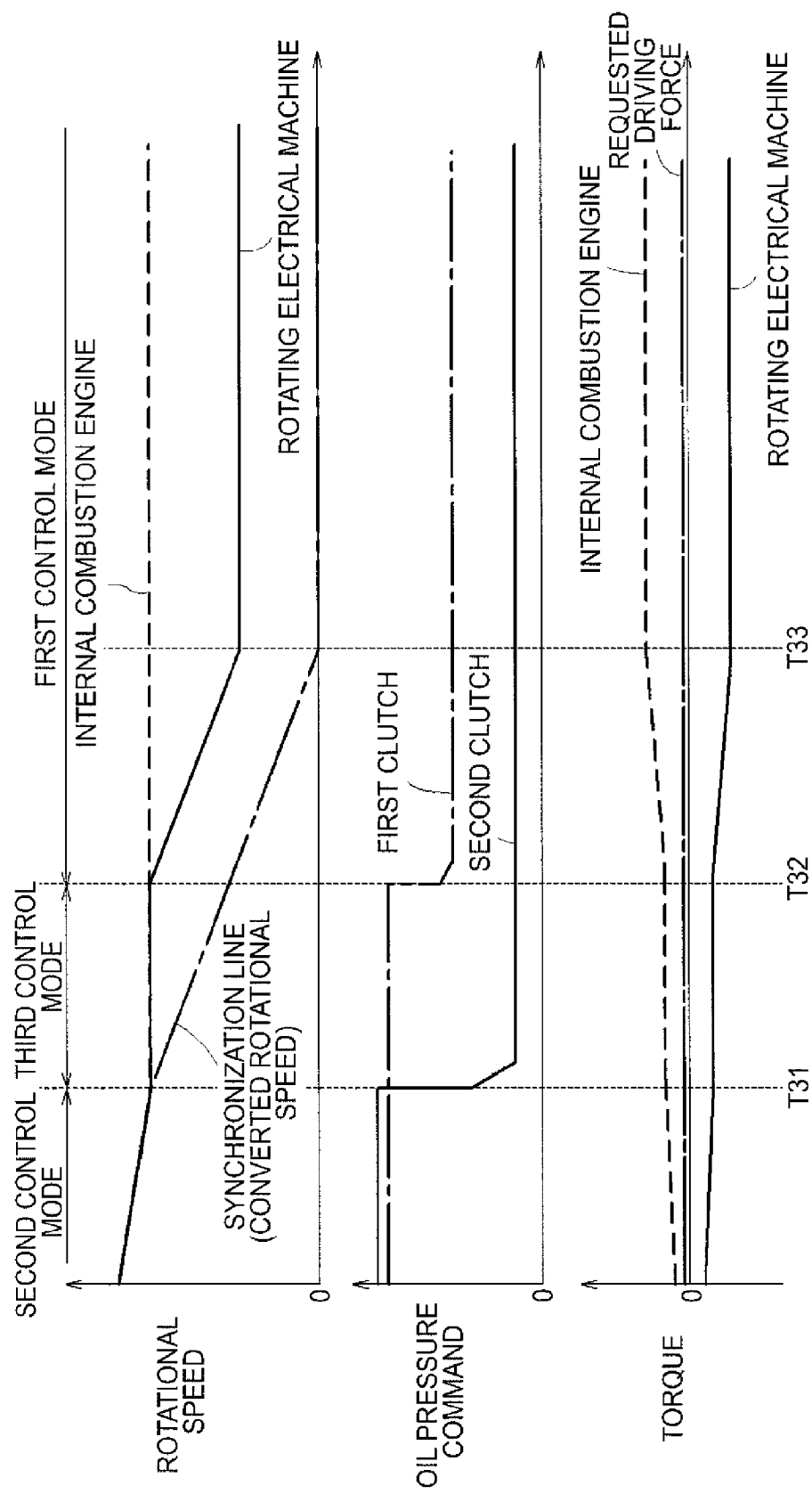
FIG. 9 is a timing chart showing a first specific example of a second mode shift according to the embodiment of the present invention.

As shown in FIG. 9, this specific example is a specific example of the second mode shift that is executed when stopping the vehicle 6 from the traveling state in the second control mode. Similar control can be executed when the vehicle 6 keeps traveling in the first control mode after execution of the second mode shift (the same applies to FIG. 10).

In the initial state (up to time T31), the vehicle 6 is traveling in the second control mode, and the rotating electrical machine 12 is generating electricity by the internal-combustion-engine torque Te with both the first clutch C1 and the second clutch C2 in the direct engagement state. The second mode shift control is started when vehicle stopping conditions for stopping the vehicle 6 are satisfied at time T31. The vehicle stopping conditions may be, e.g., the conditions that are satisfied when the operation of releasing the accelerator pedal by the driver, the operation of stepping on the brake pedal by the driver, etc. is detected.

Although not shown in the figure, in this example, the selection target amount B0 is smaller than the selection reference value D0 at the time execution of the second mode shift control is started (time T31), and the second mode shift via the third control mode is executed. Accordingly, in this example, the engagement pressure of the second clutch C2 is reduced to the slip engagement pressure at time T31. Thus, the second clutch C2 is shifted to the slip engagement state, and the drive mode is shifted from the second control mode to the third control mode. The control of reducing the engagement pressure of the second clutch C2, which is executed at time T31, corresponds to the control of shifting the second clutch C2 to the slip engagement state, which is executed in step #13 of FIG. 3 described above.

In the third control mode that is implemented at time T31 to T32, the second clutch C2 in the slip engagement state is controlled by the torque control based on the target transfer torque capacity. In this case, the target transfer torque capacity is set according to the position of the second clutch C2 on the power transmission path so that the requested driving force Td is transmitted to the wheels 15.

In the third control mode, the rotating electrical machine 12 is controlled by the rotational speed control based on the target rotational speed. In this case, the target rotational speed is set to a value that is higher than the converted rotational speed and equal to or higher than the lower limit rotational speed at which the internal combustion engine 11 can continue self-sustained operation (e.g., the idling rotational speed or a value higher than the idling rotational speed), and that can secure a requested power generation amount. In this example, the target rotational speed is set to the rotational speed of the rotating electrical machine 12 at the time the third control mode is started (time T31), and the target rotational speed is held at this rotational speed while the first control mode is being implemented. Accordingly, the difference between the rotational speed of the rotating electrical machine 12 and the converted rotational speed increases as the vehicle speed (converted rotational speed) decreases.

If the difference between the rotational speed of the rotating electrical machine 12 and the converted rotational speed becomes equal to or larger than a predetermined shift determination reference value at time T32, the engagement pressure of the first clutch C1 is reduced to the slip engagement pressure. Thus, the first clutch C1 is shifted to the slip engagement state, whereby the drive mode is shifted from the third control mode to the first control mode. The control that is executed at time T31 to T32 corresponds to the control of shifting the first clutch C1 to the slip engagement state, which is executed in step 415 of FIG. 3 described above.

In the first control mode that is implemented from time T32, the second clutch C2 in the slip engagement state is controlled by the torque control as in the case where the third control mode is implemented. The first clutch C1 in the slip engagement state is controlled (rotational speed control) by the rotational speed feedback control so that the rotational speed of the internal combustion engine 11 follows the target rotational speed. In this case, the target rotational speed is set to a value equal to or higher than the lower limit rotational speed at which the internal combustion engine 11 can continue self-sustained operation (e.g., the idling rotational speed or a value higher than the idling rotational speed). In this example, the target rotational speed is set to the rotational speed of the internal combustion engine 11 at the time the first control mode is started (time T32), and the target rotational speed is held at this rotational speed while the first control mode is being implemented.

In the first control mode, the rotating electrical machine 12 is also controlled by the rotational speed control as in the case where the third control mode is implemented. However, the target rotational speed in this case is set to a value that is higher than the converted rotational speed and lower than the rotational speed of the internal combustion engine 11, and that can secure a requested power generation amount. In this example, this target rotational speed is set so that the difference from the converted rotational speed becomes constant. Accordingly, as shown in FIG. 9, the target rotational speed of the rotating electrical machine 12 decreases as the vehicle speed (converted rotational speed) decreases, and this target rotational speed is held at a constant value from time T33 when the vehicle 6 is stopped. It is assumed in this example that the conditions for executing the wheel transmission driving force reduction control (steps #23, #24 in FIG. 4) or the conditions for executing the power generation amount reduction control (step #33 in FIG. 5) are not satisfied after the control mode is shifted to the first control mode (from time T32).

As described above, in this example, the first clutch C1 is shifted to the slip engagement state (time T32) with the second clutch C2 in the slip engagement state. This can suppress transmission of shock caused by a torque change associated with this shift to the wheels 15. In this example, the rotating electrical machine 12 is caused to generate electricity with the first clutch C1 in the slip engagement state only while the first control mode is being implemented. This can reduce energy loss due to torque transmission via the first clutch C1 and can enhance power generation efficiency.

4-2. Second Specific Example of Second Mode Shift

Figure 10:
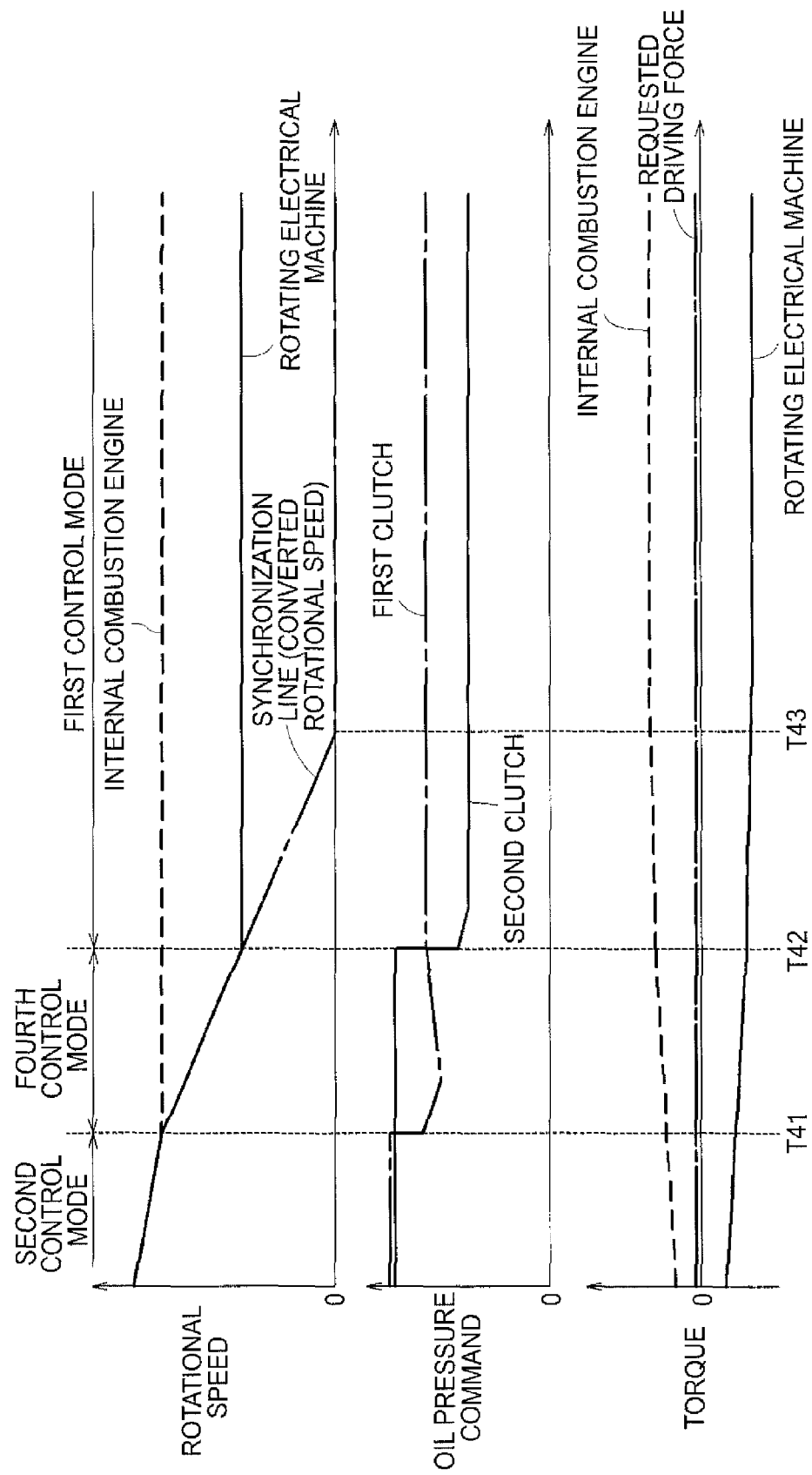
FIG. 10 is a timing chart showing a second specific example of the second mode shift according to the embodiment of the present invention.

As shown in FIG. 10, this specific example is a specific example of the second mode shift via the fourth control mode, unlike the first specific example (FIG. 9). This specific example will be described mainly with respect to the differences from the first specific example. This specific example is similar to the first specific example regarding the points that are not particularly described.

In this example, although not shown in the figure, the selection target amount B0 is equal to or larger than the selection reference value D0 at the time execution of the second mode shift control is started (time T41), and the second mode shift via the fourth control mode is executed. Accordingly, in this example, the engagement pressure of the first clutch C1 is reduced to the slip engagement pressure at time T41. Thus, the first clutch C1 is shifted to the slip engagement state, and the drive mode is shifted from the second control mode to the fourth control mode. The control of reducing the engagement pressure of the first clutch C1, which is executed at time T41, corresponds to the control of shifting the first clutch C1 to the slip engagement state, which is executed in step #17 of FIG. 3 described above.

In the fourth control mode that is implemented at time T41 to T42, the first clutch C1 in the slip engagement state is controlled (rotational speed control) by the rotational speed feedback control so that the rotational speed of the internal combustion engine 11 follows the target rotational speed. In this case, the target rotational speed is set to a value equal to or higher than the lower limit rotational speed at which the internal combustion engine 11 can continue self-sustained operation (e.g., the idling rotational speed or a value higher than the idling rotational speed). In this example, the target rotational speed is set to the rotational speed of the internal combustion engine 11 at the time the fourth control mode is started (time T41), and the target rotational speed is held at this rotational speed while the fourth control mode is being implemented and while the first control mode is being implemented after the fourth control mode. Accordingly, as shown in FIG. 10, the rotational speed difference between the internal combustion engine 11 and the rotating electrical machine 12 increases as the vehicle speed (converted rotational speed) decreases.

If the rotational speed difference between the internal combustion engine 11 and the rotating electrical machine 12 becomes equal to or larger than the predetermined shift determination reference value at time T42, the engagement pressure of the second clutch C2 is reduced to the slip engagement pressure. The second clutch C2 is thus shifted to the slip engagement state, whereby the drive mode is shifted from the fourth control mode to the first control mode. The control that is executed at time T41 to T42 corresponds to the control of shifting the second clutch C2 to the slip engagement state, which is executed in step #19 of FIG. 3 described above.

In the first control mode that is implemented from time T42, the first clutch C1 in the slip engagement state is controlled by the rotational speed control as in the case where the fourth control mode is implemented. The second clutch C2 in the slip engagement state is controlled by the torque control based on the target transfer torque capacity. In this case, the target transfer torque capacity is set according to the position of the second clutch C2 on the power transmission path so that the requested driving force Td is transmitted to the wheels 15.

In the first control mode, the rotating electrical machine 12 is controlled by the rotational speed control based on the target rotational speed. In this case, the target rotational speed is set to a value that is higher than the converted rotational speed and lower than the rotational speed of the internal combustion engine 11, and that can secure a requested power generation amount. In this example, this target rotational speed is set to a constant value. Accordingly, as shown in FIG. 10, the difference between the rotational speed of the rotating electrical machine 12 and the converted rotational speed increases as the vehicle speed (converted rotational speed) decreases. The difference between the rotational speed of the rotating electrical machine 12 and the converted rotational speed becomes constant from time T43 the vehicle 6 is stopped.

As described above, in this example, the rotating electrical machine 12 is caused to generate electricity with the second clutch C2 in the slip engagement state only while the first control mode is being implemented. This can suppress an excessive increase in temperature of the second clutch C2.

3. Other Embodiments

Lastly, other embodiments of the control device according to the present invention will be described. Configurations disclosed in each of the following embodiments can be combined with those disclosed in other embodiments as appropriate as long as no consistency arises.

(1) The above embodiment is described with respect to an example in which the torque correction control unit 54 executes in parallel the two kinds of torque correction control, namely the first torque correction control and the second torque correction control. However, embodiments of the present invention are not limited to this, and the torque correction control unit 54 may execute only one of the first torque correction control and the second torque correction control, or may execute neither the first torque correction control nor the second torque correction control.

(2) The above embodiment is described with respect to an example in which in both the first mode shift and the second mode shift, the mode shift is executed via the third control mode if the selection target amount B0 is smaller than the selection reference value D0, and the mode shift is executed via the fourth control mode if the selection target amount B0 is equal to or larger than the selection reference value D0. However, embodiments of the present invention are not limited to this. In one of the first mode shift and the second mode shift, the mode shift may be executed via the third control mode if the selection target amount B0 is smaller than the selection reference value D0, and the mode shift may be executed via the fourth control mode if the selection target amount B0 is equal to or larger than the selection reference value D0. In this case, the other mode shift may be executed via the fixed drive mode. In this case, the other mode shift may be executed via a drive mode different from the third control mode and the fourth control mode. Alternatively, the other mode shift may be executed directly without via any other drive modes. That is, the respective engagement states of the first clutch C1 and the second clutch C2 may be shifted simultaneously.

(3) The above embodiment is described with respect to an example in which whether the mode shift is executed via the third control mode or the fourth control mode is determined when execution of the first mode shift control or the second mode shift control is started. However, embodiments of the present invention are not limited to this, and whether the selection target amount B0 is smaller than the selection reference value D0 may also be determined during the mode shift control, and the drive mode via which the mode shift is executed may be switched if the relation of the magnitude between the selection target amount B0 and the selection reference value D0 is reversed.

(4) The above embodiment is described with respect to an example in which one (second clutch C2) of the shifting engagement devices in the speed change mechanism 13 is the "second engagement device." However, embodiments of the present invention are not limited to this. That is, any other engagement device in the speed change mechanism 13 may be the "second engagement device" if this engagement device is provided on the wheel 15 side with respect to the rotating electrical machine 12 on the power transmission path connecting the internal combustion engine 11 and the wheels 15.

In the case where, e.g., a fluid coupling is provided between the rotating electrical machine 12 and the wheels 15, a lockup clutch of the fluid coupling may be the "second engagement device." Alternatively, for example, a dedicated transmission clutch is provided between the rotating electrical machine 12 and the wheels 15, and this transmission clutch may be the "second engagement device." In these cases, an automatic stepless speed change mechanism, a manual stepped speed change mechanism, a fixed speed change mechanism, etc.

may be used as the speed change mechanism 13. The speed change mechanism 13 can be placed at any position.

(5) The above embodiment is described with respect to an example in which the first clutch C1 and the second clutch C2 are hydraulically driven engagement devices whose engagement pressure is controlled according to the supplied oil pressure. However, embodiments of the present invention are not limited to this. That is, the first clutch C1 and the second clutch C2 need only be able to adjust the transfer torque capacity according to an increase or decrease in engagement pressure. For example, one or both of the first clutch C1 and the second clutch C2 may be an electromagnetic engagement device whose engagement pressure is controlled by the electromagnetic force.

(6) The above embodiment is described with respect to an example in which the internal-combustion-engine control device 30 is provided in addition to the control device 40. However, embodiments of the present invention are not limited to this, and the internal-combustion-engine control device 30 may be integrated with the control device 40. Assignment of the friction units in the control device 40 described in the above embodiment is shown by way of example only, and two or more of the function units may be combined or any one of the function units may further be divided into a plurality of function units.

(7) The above embodiment is described with respect to an example in which the internal-combustion-engine output shaft such as the crankshaft of the internal combustion engine 11 and the input shaft I rotate together. However, the internal-combustion-engine output shaft may be drivingly coupled to the input shaft I via a member such as a damper or a flywheel.

(8) Regarding other configurations as well, the embodiments disclosed in the specification are by way of example only in all respects, and embodiments of the present invention are not limited to them. That is, those configurations which are not described in the claims of the present application may be modified as appropriate without departing from the object of the present invention.

The present invention can be preferably used for control devices that control a vehicle drive device in which a first engagement device, a rotating electrical machine, and a second engagement device are sequentially provided from the internal combustion engine side on a power transmission path connecting the internal combustion engine and wheels.

The invention claimed is:

1. A control device that controls a vehicle drive device in which a first engagement device, a rotating electrical machine, and a second engagement device are sequentially provided from an internal combustion engine side in a power transmission path connecting an internal combustion engine and wheels, comprising:
a mode control unit that switches among a first control mode in which the rotating electrical machine is caused to generate electricity with both the first engagement device and the second engagement device in a slip engagement state, a second control mode in which the rotating electrical machine is caused to generate electricity with both the first engagement device and the second engagement device in a direct engagement state, a third control mode in which the rotating electrical machine is caused to generate electricity with the first engagement device in the direct engagement state and with the second engagement device in the slip engagement state, and a fourth control mode in which the rotating electrical machine is caused to generate electricity with the first engagement device in the slip engagement state and with the second engagement device in the direct engagement state; and
a target-amount obtaining unit that obtains at least one of a temperature and a heat generation amount of the second engagement device as a selection target amount, wherein
in at least one of a mode shift from the first control mode to the second control mode and a mode shift from the second control mode to the first control mode, the mode control unit executes the mode shift directly via only the third control mode if the selection target amount is smaller than a predetermined selection reference value, and executes the mode shift directly via only the fourth control mode if the selection target amount is equal to or larger than the selection reference value.

2. The control device according to claim 1, wherein
the target-amount obtaining unit obtains at least one of a temperature and a heat generation amount of the first engagement device as a first determination target amount, and obtains at least one of the temperature and the heat generation amount of the second engagement device as a second determination target amount,
if the first determination target amount is smaller than a predetermined first determination reference value and the second determination target amount is smaller than a predetermined second determination reference value in the first control mode, control according to a requested driving force, which is requested to drive the wheels, is executed so that the requested driving force is transmitted to the wheels, and
if the first determination target amount is equal to or larger than the first determination reference value and the second determination target amount is equal to or larger than the second determination reference value in the first control mode, control of reducing output torque of the internal combustion engine is executed so that a driving force that is transmitted to the wheels becomes smaller than the requested driving force.

3. The control device according to claim 2, wherein
the target-amount obtaining unit obtains at least one of the temperature and the heat generation amount of the first engagement device as the first determination target amount, and
if the first determination target amount becomes equal to or larger than a predetermined third determination reference value in the first control mode, control of reducing output torque of the rotating electrical machine to reduce a power generation amount of the rotating electrical machine and to reduce the output torque of the internal combustion engine according to an amount of reduction in the output torque of the rotating electrical machine is executed.

4. The control device according to claim 1, wherein the mode control unit:
first determines that the mode shift from the first control mode to the second control mode or the mode shift from the second control mode to the first control mode is to be executed; and
then compares the selection target amount to the selection reference value.

* * * * *